(12) United States Patent
Kang et al.

(10) Patent No.: US 10,658,971 B2
(45) Date of Patent: May 19, 2020

(54) PHOTOVOLTAIC MODULE AND PHOTOVOLTAIC SYSTEM INCLUDING THE SAME

(71) Applicant: LG ELECTRONICS INC., Seoul (KR)

(72) Inventors: Juwan Kang, Seoul (KR); Jaesung You, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 555 days.

(21) Appl. No.: 15/217,508

(22) Filed: Jul. 22, 2016

(65) Prior Publication Data

US 2017/0025993 A1 Jan. 26, 2017

(30) Foreign Application Priority Data

Jul. 23, 2015 (KR) .................. 10-2015-0104507

(51) Int. Cl.
*H02S 40/32* (2014.01)
*H02M 7/5387* (2007.01)
*H02S 30/10* (2014.01)
*H02S 40/34* (2014.01)
*H02S 40/36* (2014.01)
*H02M 3/335* (2006.01)

(52) U.S. Cl.
CPC ......... *H02S 40/32* (2014.12); *H02M 3/33507* (2013.01); *H02M 7/5387* (2013.01); *H02S 30/10* (2014.12); *H02S 40/34* (2014.12); *H02S 40/36* (2014.12)

(58) Field of Classification Search
CPC .......... H02S 30/10; H02S 40/34; H02S 40/36; H02S 40/32; H02M 3/33507; H02M 7/5387

See application file for complete search history.

(56) References Cited

U.S. PATENT DOCUMENTS

| | | | |
|---|---|---|---|
| 7,566,232 B2 * | 7/2009 | Iida ....................... | H02J 7/0045 363/37 |
| 8,455,752 B2 * | 6/2013 | Korman .................. | H02S 40/32 136/251 |
| 8,716,892 B2 * | 5/2014 | Min ......................... | H02J 1/00 307/72 |

(Continued)

FOREIGN PATENT DOCUMENTS

| | | |
|---|---|---|
| EP | 2413382 A2 | 2/2012 |
| EP | 2897287 A1 | 7/2015 |

(Continued)

*Primary Examiner* — Golam Mowla
(74) *Attorney, Agent, or Firm* — Birch, Stewart, Kolasch & Birch, LLP

(57) ABSTRACT

Disclosed are a photovoltaic module and a photovoltaic system including the same. The photovoltaic module includes a solar cell module, a converter to convert a DC voltage from the solar cell module, an inverter to convert the DC voltage from the converter into an AC voltage, and a plug to outwardly output the AC voltage from the inverter, the plug having a ground terminal. The ground terminal is electrically connected to a ground of the inverter, and the ground of the inverter is electrically connected to a ground of the solar cell module. Thereby, the AC voltage from the photovoltaic module is directly supplied to an outlet inside or outside a building.

12 Claims, 15 Drawing Sheets

(56) References Cited

U.S. PATENT DOCUMENTS

| | | |
|---|---|---|
| 2009/0242272 A1 | 10/2009 | Little et al. |
| 2011/0140648 A1* | 6/2011 | Lee .................... H02J 3/32 320/101 |
| 2011/0308177 A1 | 12/2011 | Hickman |
| 2012/0024563 A1 | 2/2012 | Korman et al. |
| 2013/0207466 A1* | 8/2013 | Lee .................... H02J 4/00 307/23 |
| 2014/0007926 A1 | 1/2014 | Korman et al. |
| 2014/0217826 A1* | 8/2014 | Oguchi ............... H02J 7/35 307/46 |
| 2015/0200623 A1 | 7/2015 | Kang et al. |
| 2016/0094087 A1* | 3/2016 | Satake ................ H02J 3/383 307/23 |
| 2017/0117746 A1* | 4/2017 | Kang .................. H02J 7/007 |

FOREIGN PATENT DOCUMENTS

| | | |
|---|---|---|
| JP | 2007-259694 A | 10/2007 |
| JP | 2009-110510 A | 5/2009 |
| JP | 2013-525908 A | 6/2013 |

* cited by examiner

PHOTOVOLTAIC MODULE AND PHOTOVOLTAIC SYSTEM INCLUDING THE SAME

CROSS-REFERENCE TO RELATED APPLICATION

This application claims the priority benefit of Korean Patent Applications No. 10-2015-0104507, filed on Jul. 23, 2015 in the Korean Intellectual Property Office, the disclosure of which is incorporated herein by reference.

BACKGROUND OF THE INVENTION

Field of the Invention

Embodiments of the present invention relate to a photovoltaic module and a photovoltaic system including the same, and more particularly, to a photovoltaic module and a photovoltaic system including the same, which may directly supply an Alternating Current (AC) voltage from the photovoltaic module to an outlet inside or outside a building.

Description of the Related Art

In recent years, due to depletion of existing energy resources, such as petroleum and coal, interest in alternative sources of energy to replace the existing energy resources is increasing. Most of all, solar cells are popular next generation cells to convert sunlight into electrical energy using semiconductor devices.

Meanwhile, a photovoltaic module is defined by series or parallel connection of solar cells for photovoltaic power generation. The photovoltaic module may include a junction box for gathering electricity generated by the solar cells.

SUMMARY OF THE INVENTION

It is an object of the embodiments of the present invention to provide a photovoltaic module and a photovoltaic system including the same, which may directly supply an Alternating Current (AC) voltage from the photovoltaic module to an outlet inside or outside a building.

In accordance with one aspect of the present invention, the above and other objects can be accomplished by the provision of a photovoltaic module including a solar cell module, a converter to convert a direct current (DC) voltage from the solar cell module, an inverter to convert the DC voltage from the converter into an alternating current (AC) voltage, and a plug to outwardly output the AC voltage from the inverter, the plug having a ground terminal, wherein the ground terminal is electrically connected to a ground of the inverter, and wherein the ground of the inverter is electrically connected to a ground of the solar cell module.

In accordance with another aspect of the present invention, there is provided a photovoltaic system including a plurality of photovoltaic modules each including a plug provided with a ground terminal, a connector connected to each plug of the photovoltaic modules, and an integration plug connected to the connector and provided with a ground terminal, wherein each of the photovoltaic modules includes a solar cell module, a converter to convert a DC voltage from the solar cell module, an inverter to convert the DC voltage from the converter into an AC voltage, and the plug to outwardly output the AC voltage from the inverter, the plug being provided with the ground terminal, wherein the ground terminal in each plug of the photovoltaic modules is electrically connected to a ground of the inverter, and wherein the ground of the inverter is electrically connected to a ground of the solar cell module.

In accordance with a further aspect of the present invention, there is provided a photovoltaic system including a plurality of photovoltaic modules each including a plug provided with a ground terminal, a first connector connected to a first plug of a first photovoltaic module among the photovoltaic modules, a first connector plug connected to the first connector and provided with a ground terminal, a second connector connected to the first connector plug and connected to a second plug of a second photovoltaic module among the photovoltaic modules, and a second connector plug connected to the second connector and provided with a ground terminal, wherein each of the photovoltaic modules includes a solar cell module, a converter to convert a DC voltage from the solar cell module, an inverter to convert the DC voltage from the converter into an AC voltage, and the plug to outwardly output the AC voltage from the inverter, the plug being provided with the ground terminal, wherein the ground terminal in each plug of the photovoltaic modules is electrically connected to a ground of the inverter, and wherein the ground of the inverter is electrically connected to a ground of the solar cell module.

BRIEF DESCRIPTION OF THE DRAWINGS

The above and other objects, features and other advantages of the embodiments of the present invention will be more clearly understood from the following detailed description taken in conjunction with the accompanying drawings, in which.

DETAILED DESCRIPTION OF THE EMBODIMENTS

Hereinafter, the embodiments of the present invention will be described in detail with reference to the accompanying drawings.

With respect to constituent elements used in the following description, suffixes "module" and "unit" are given or mingled with each other only in consideration of ease in the preparation of the specification, and do not have or serve as different meanings. Accordingly, the suffixes "module" and "unit" may be mingled with each other.

Figure 1:
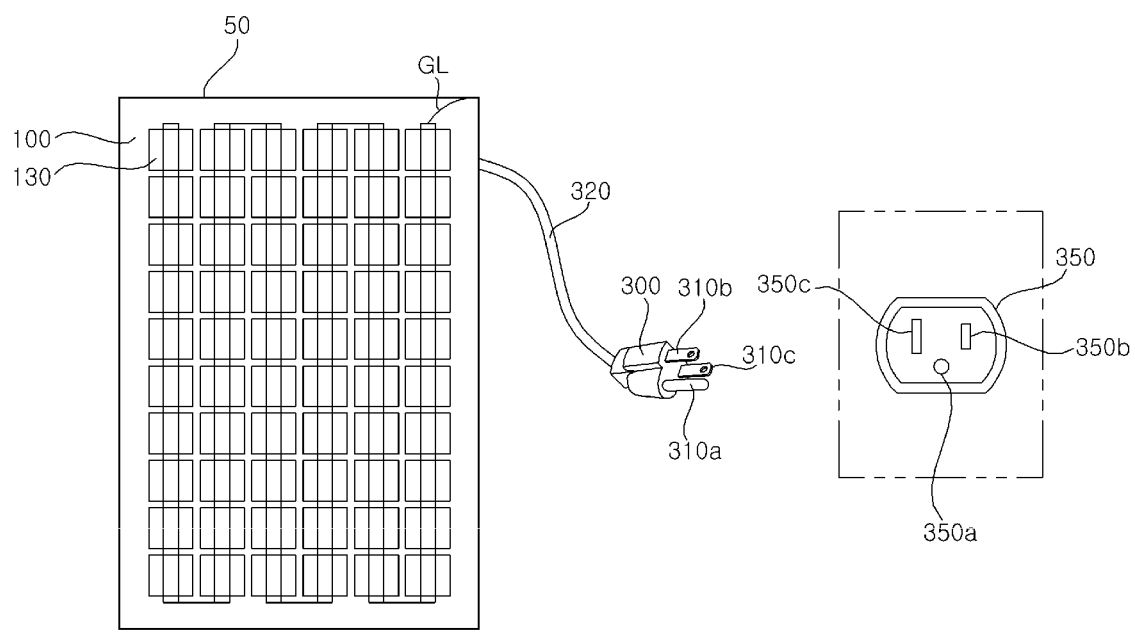
FIG. 1 is a front view illustrating a photovoltaic module according to an embodiment of the present invention.
Figure 2:
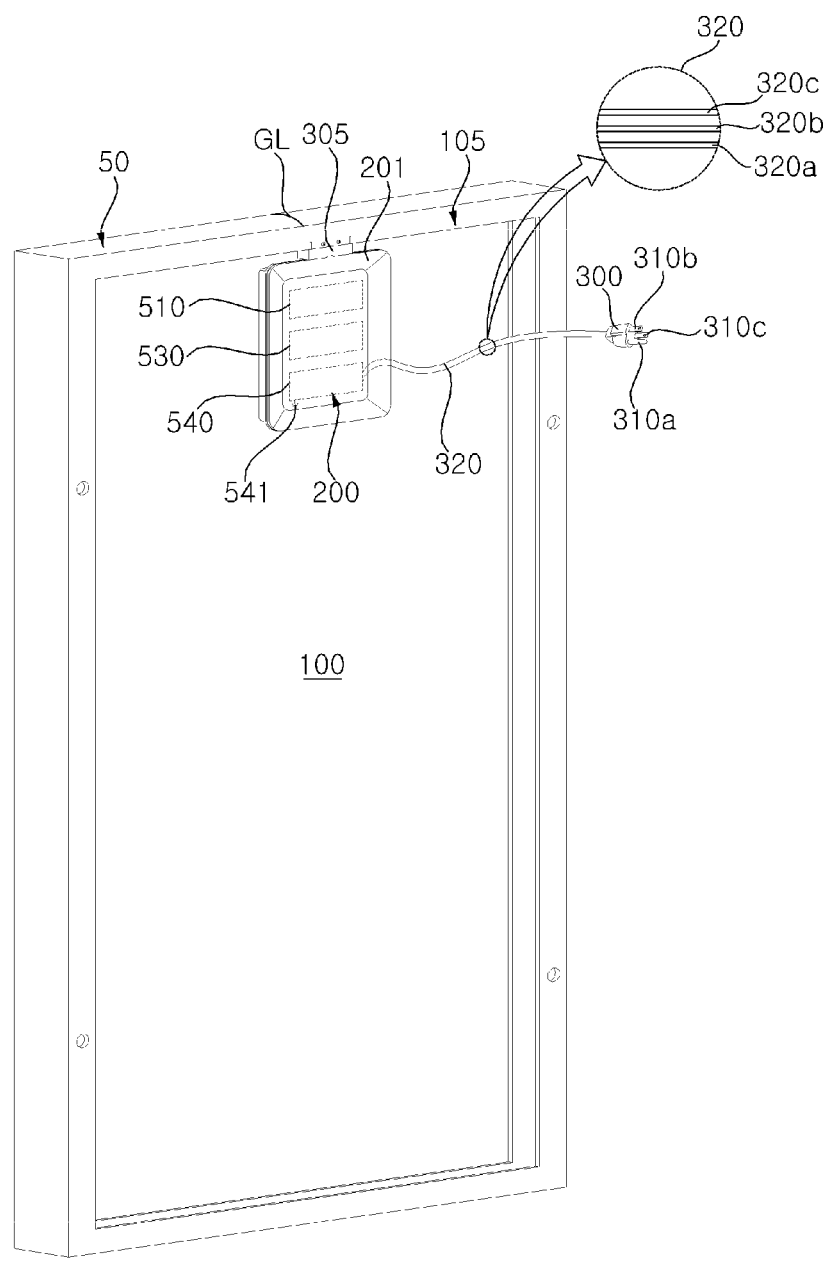
FIG. 2 is a rear view of the photovoltaic module illustrated in FIG. 1.

FIG. 1 is a front view illustrating a photovoltaic module according to an embodiment of the present invention, and FIG. 2 is a rear view of the photovoltaic module illustrated in FIG. 1.

Referring to FIGS. 1 and 2, the photovoltaic module according to the embodiment of the present invention, designated by reference numeral 50, includes a solar cell module 100 and a junction box 200 disposed on the back surface of the solar cell module 100. In addition, the photovoltaic module 50 may further include a heat dissipation member interposed between the solar cell module 100 and the junction box 200.

First, the solar cell module 100 may include a plurality of solar cells 130.

The solar cells 130 are semiconductor devices that convert solar energy into electrical energy, and may be, for example, silicon solar cells, compound semiconductor solar cells, tandem solar cells, dye sensitized solar cells, or CdTe or CIGS type solar cells.

The respective solar cells 130 may be electrically connected in series, in parallel, or in series-parallel combination to one another.

Although FIG. 1 illustrates ten solar cells 130 interconnected to form one string and a total of six strings interconnected in series, various alterations are possible.

Meanwhile, a ground line GL of the solar cell module 100 may be electrically connected to any one string, among the strings, for ground connection to carry a Direct Current (DC) voltage from the solar cells 130.

The ground line GL of the solar cell module 100 may be electrically connected to a frame 105 of the solar cell module 100, which is formed as a conductive member.

FIG. 2 illustrates that the ground line GL of the solar cell module 100 extends to the back surface of the solar cell module 100 and is electrically connected to the frame 105 of the solar cell module 100, which is formed on the back surface of the solar cell module 100.

Meanwhile, the photovoltaic module 50 according to the embodiment of the present invention includes the solar cell module 100, a converter unit (or converter) 530 for converting a DC voltage from the solar cell module 100, an inverter 540 for converting the DC voltage from the converter unit 530 into an AC voltage, and a plug 300 for outwardly outputting the AC voltage from the inverter 540, the plug 300 having a ground terminal 310a.

In particular, the photovoltaic module 50 may further include an AC power cable 320 between the inverter 540 and the plug 300.

The AC power cable 320 includes three conductive lines. As illustrated in FIG. 2, the AC power cable 320 may include a first power line 320b, a second power line 320c, and a ground line 320a.

The first power line 320b, the second power line 320c, and the ground line 320a may be electrically connected to a first power terminal 310b, a second power terminal 310c, and the ground terminal 310a of the plug 300 respectively.

Here, the first power terminal 310b, the second power terminal 310c, and the ground terminal 310a may be a hot terminal, a neutral terminal, and a ground terminal based on the North American standard.

Meanwhile, the plug 300, which includes the first power terminal 310b, the second power terminal 310c, and the ground terminal 310a, is connectable to respective terminals 350a, 350b and 350c of an outlet 350, which is located inside or outside a building. With this connection, an AC voltage from the photovoltaic module 50 may be simply supplied to a system through the outlet inside the building.

With this method of the embodiment of the present invention, a separate device for connecting the photovoltaic module 50 and the outlet 350 to each other is not necessary, resulting in improved user convenience. In particular, it is possible to allow a purchaser of the photovoltaic module 50 to install the photovoltaic module 50 inside a building and to connect the photovoltaic module 50 to the outlet 350 using the plug 300 in a simplified manner without any help from a service provider.

Meanwhile, in the photovoltaic module 50 according to the embodiment of the present invention, a ground terminal 541 of the inverter 540 and the ground terminal 310a of the plug 300 are electrically connected to each other.

FIG. 2 illustrates that the ground line 320a inside the AC power cable 320, which is electrically connected to the ground terminal 310a of the plug 300, is electrically connected to the inverter 540. In particular, the ground line 320a may be electrically connected to the ground terminal 541 of the inverter 540.

Accordingly, it is unnecessary to provide a separate ground to be connected to the ground terminal 541 of the inverter 540, which is advantageous.

Meanwhile, referring to FIG. 2, the ground terminal 541 of the inverter 540 may be connected to a frame 201 of the junction box 200, which is formed as a conductive member.

In addition, the frame 201 of the junction box 200 may be electrically connected to the frame 105 of the solar cell module 100 via a conductive member 305.

Through this connection, the ground line GL of the solar cell module 100 is electrically connected to the ground terminal 310a of the plug 300 through the frame 105 of the solar cell module 100, the frame 201 of the junction box 200, and the ground terminal 541 of the inverter 540.

Accordingly, it is unnecessary to provide a separate ground to be connected to the ground line GL of the solar cell module 100, which is advantageous.

Meanwhile, the junction box 200 may include a bypass diode unit 510, the converter unit 530, a capacitor C1, the inverter 540, and a controller 550. This will be described below with reference to FIGS. 9 to 15.

Figure 3:
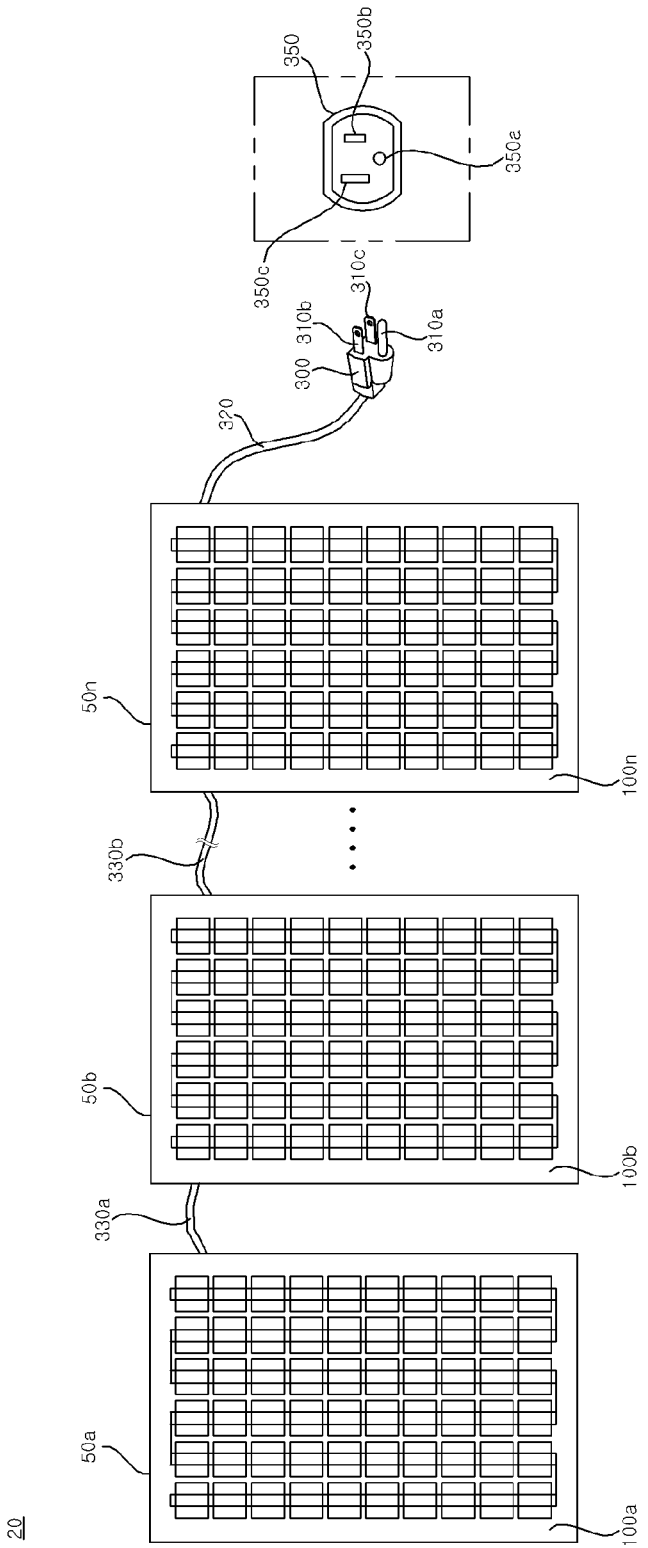
FIG. 3 is a view illustrating one example configuration of a photovoltaic system according to an embodiment of the present invention.

FIG. 3 is a view illustrating one example configuration of a photovoltaic system according to an embodiment of the present invention.

Referring to FIG. 3, the photovoltaic system according to the embodiment of the present invention, designated by reference numeral 20, may include a plurality of photovoltaic modules 50a, 50b, . . . , 50n, each of which is provided with a plug having a ground terminal, and respective solar cell modules 100*a*, 100*b*, . . . , 100*n*.

FIG. 3 illustrates that a first photovoltaic module 50*a* having a first cable 330*a* for outputting an AC voltage, a second photovoltaic module 50*b* having a second cable 330*b* for outputting an AC voltage, and an nth photovoltaic module 50*n* having an nth cable 320 for outputting an AC voltage and the plug 300 are electrically connected to one another.

In FIG. 3, an end of the first cable 330*a* may be connected to a first plug 300*a*, and the first plug 300*a* may be electrically connected to a first interface unit provided in the second photovoltaic module 50*b*. Further, the second cable 330*b* may be electrically connected to a second interface unit provided in the second photovoltaic module 50*b*.

Meanwhile, the second interface unit may sum an AC voltage from the first interface unit with an AC voltage from the second photovoltaic module 50*b*, and then outwardly output the AC voltage through the second cable 330*b*.

Meanwhile, an end of the second cable 330*b* may be connected to a second plug 300*b*, and the second plug 300*b* may be electrically connected to a first interface unit provided in the nth photovoltaic module 50*n*. Further, the nth cable 320 may be electrically connected to a second interface unit provided in the nth photovoltaic module 50*b*.

Meanwhile, an end of the nth cable 320 may be connected to the plug 300, and the plug 300 may be electrically connected to the outlet 350.

Figure 4:
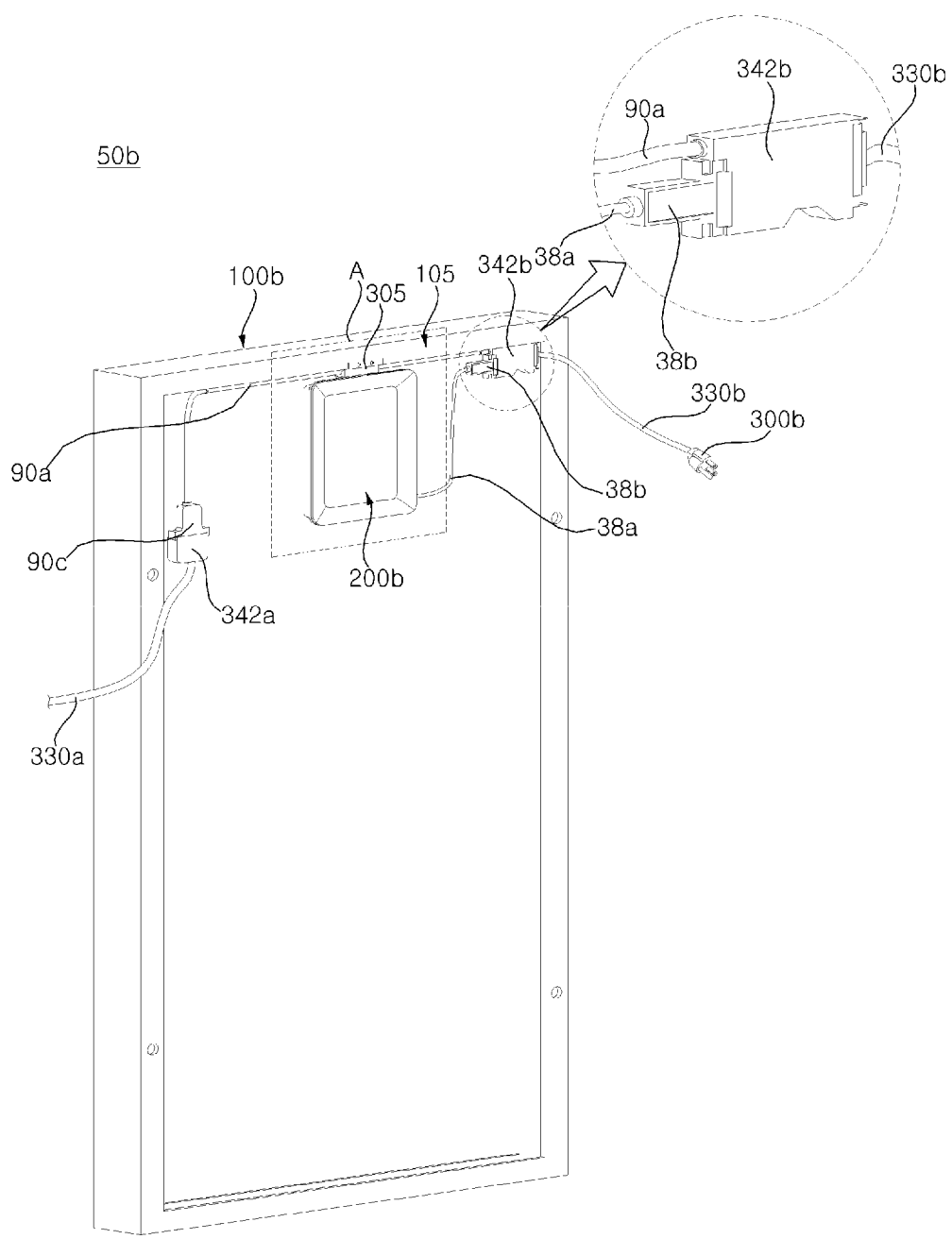
FIG. 4 is a rear view of a second photovoltaic module illustrated in FIG. 3.

FIG. 4 is a rear view of the second photovoltaic module illustrated in FIG. 3.

Referring to FIG. 4, the second photovoltaic module 50*b* may be provided on the back surface thereof with a junction box 200*b*, a first interface unit 342*a*, a second interface unit 342*b*, the second cable 330*b*, and the second plug 300*b*.

The first interface unit 342*a* receives an AC voltage from the adjacent photovoltaic module. FIG. 4 illustrates the first interface unit 342*a* electrically connected to the AC power cable 330*a*.

Meanwhile, a cable 90*a* may be provided in order to electrically connect the first interface unit 342*a* and the second interface unit 342*b* to each other. A connector 90*c* for coupling with the first interface unit 342*a* may be connected to one end of the cable 90*a*, and the other end of the cable 90*a* may be electrically connected to the second interface unit 342*b*.

The second interface unit 342*b* receives an AC voltage from the first interface unit 342*a* and an AC voltage from the inverter 540, and outputs the AC voltage to the second plug 300*b* through the second cable 330*b*.

To this end, the second interface unit 342*b* may be electrically connected to a cable 38*a* from the inverter 540 inside the junction box 200*b*.

That is, one end of the cable 38*a* may be electrically connected to the inverter 540 inside the junction box 200*b*, and the other end of the cable 38*a* may be connected to a connector 38*b* for coupling with the second interface unit 342*b*.

Figure 5:
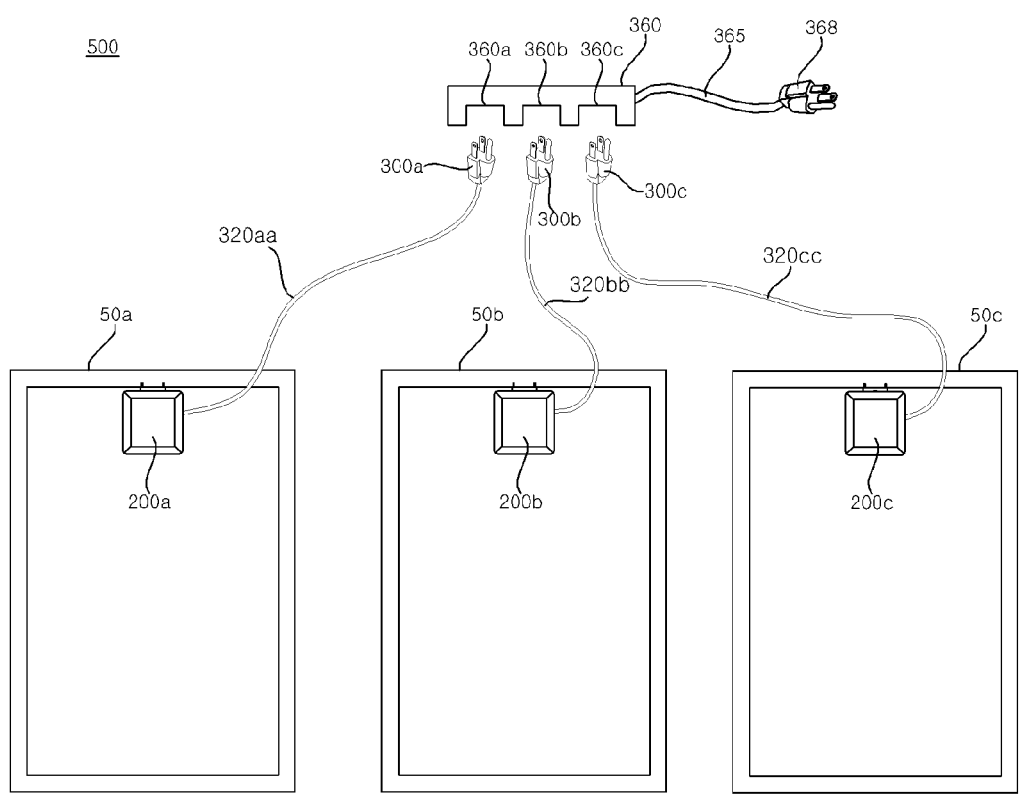
FIG. 5 is a view illustrating another example configuration of a photovoltaic system according to an embodiment of the present invention.

FIG. 5 is a view illustrating another example configuration of a photovoltaic system according to an embodiment of the present invention.

Referring to FIG. 5, the photovoltaic system 500 may include multiple photovoltaic modules 50*a*, 50*b* and 50*c*, which are connected respectively to plugs 300*a*, 300*b* and 300*c*, each having a ground terminal, through respective cables 320*aa*, 320*bb* and 320*cc* from respective junction boxes 200*a*, 200*b* and 200*c*.

In addition, the photovoltaic system 500 of FIG. 5 may include a connector 360, which is connected to the respective plugs 300*a*, 300*b* and 300*c* of the photovoltaic modules 50*a*, 50*b* and 50*c*, and an integration plug 368, which is connected to the connector 360 and includes the ground terminal 310*a*.

The connector 360 may be provided with connectors 360*a*, 360*b* and 360*c* for electrical connection with the respective plugs 300*a*, 300*b* and 300*c* of the photovoltaic modules 50*a*, 50*b* and 50*c*.

Meanwhile, an AC power cable 365 may be provided between the connector 360 and the integration plug 368.

The connector 360 may be provided with a first connector terminal, a second connector terminal, and a third connector terminal for electrical connection with a first power terminal, a second power terminal, and a ground terminal provided in each of the plugs 300*a*, 300*b* and 300*c*.

In addition, the first connector terminal, the second connector terminal, and the third connector terminal of the connector 360 are connected to one another in parallel, and consequently, sum AC voltages input through the respective plugs 300*a*, 300*b* and 300*c* in parallel and output the summed AC voltages.

Through the connector 360 and the integration plug 368, an AC voltage generated in the photovoltaic modules 50*a*, 50*b* and 50*c* may be supplied to an outlet inside or outside a building in a simplified manner.

Figure 6:
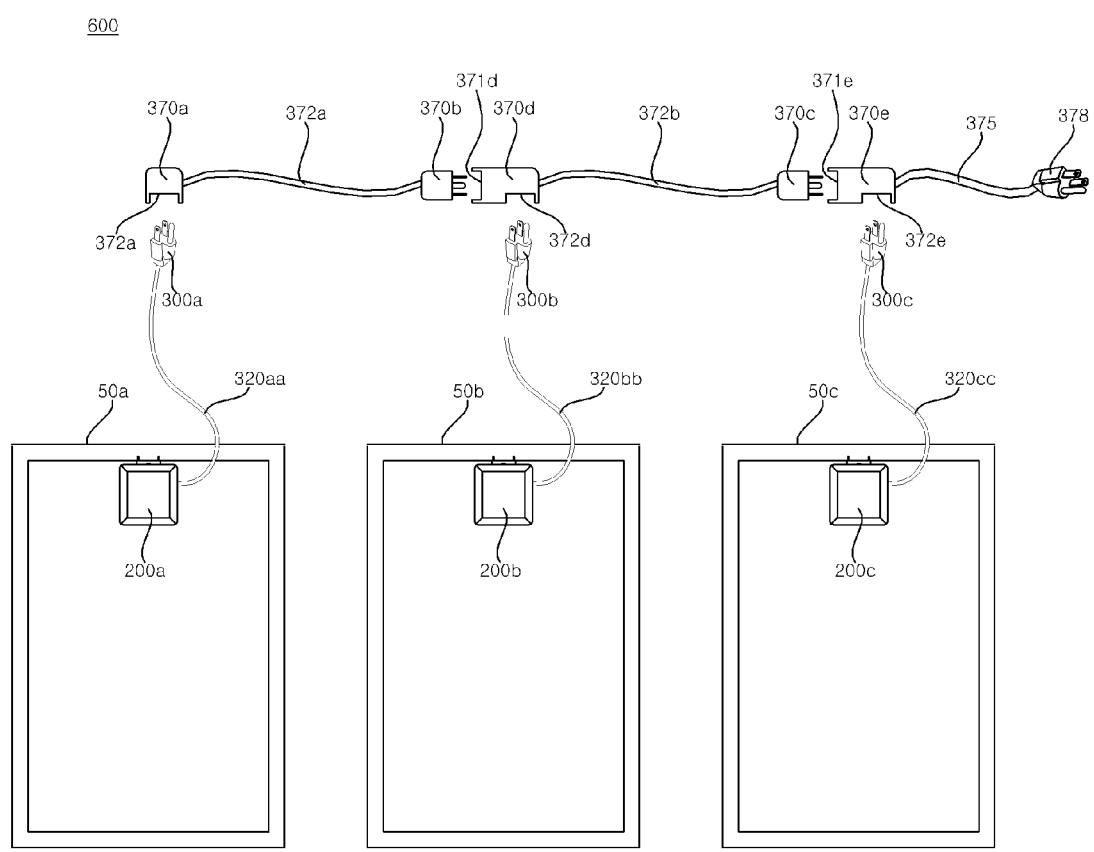
FIG. 6 is a view illustrating a further example configuration of a photovoltaic system according to an embodiment of the present invention.

FIG. 6 is a view illustrating a further example configuration of a photovoltaic system according to an embodiment of the present invention.

Referring to FIG. 6, the photovoltaic system 600 may include multiple photovoltaic modules 50*a*, 50*b* and 50*c*, which are connected respectively to plugs 300*a*, 300*b* and 300*c*, each having a ground terminal, through respective cables 320*aa*, 320*bb* and 320*cc*.

In addition, the photovoltaic system 600 of FIG. 6 may include connectors 370*a*, 370*d* and 370*e*, which are connected to the respective plugs 300*a*, 300*b* and 300*c* of the photovoltaic modules 50*a*, 50*b* and 50*c*, connector plugs 370*b* and 370*c*, which are connected to the connectors 370*a* and 370*d* and have ground terminals respectively, and a final plug 378, which is connected to the final connector 370*e* and has a ground terminal.

The first connector 370*a* may have a connection portion 372*a*, which is electrically connected to the first plug 300*a* of the first photovoltaic module 50*a*.

Meanwhile, one end of the first connector 370*a* may be provided with a cable 372*a* and the first connector plug 370*b*, which are used for electrical connection with the second connector 370*d*.

The second connector 370*d* may have a connection portion 372*d*, which is electrically connected to the second plug 300*b* of the second photovoltaic module 50*b*.

Meanwhile, one end of the second connector 370*d* may be provided with a cable 372*b* and the second connector plug 370*c*, which are used for electrical connection with the third connector 370*e*.

The third connector 370*e* may have a connection portion 372*e*, which is electrically connected to the third plug 300*c* of the third photovoltaic module 50*c*.

Meanwhile, one end of the third connector 370*e* may be provided with a cable 375 for electrical connection with the plug 378.

Through the connectors 370*a*, 370*d* and 370*e*, the first and second connector plugs 370*b* and 370*c*, which are connected to the first and second connectors 370*a* and 370*d* and have ground terminals respectively, and the final plug 378, which is connected to the final third connector 370e and has a ground terminal, an AC voltage generated in the photovoltaic modules 50a, 50b and 50c may be supplied to an outlet inside or outside a building in a simplified manner.

Figure 7:
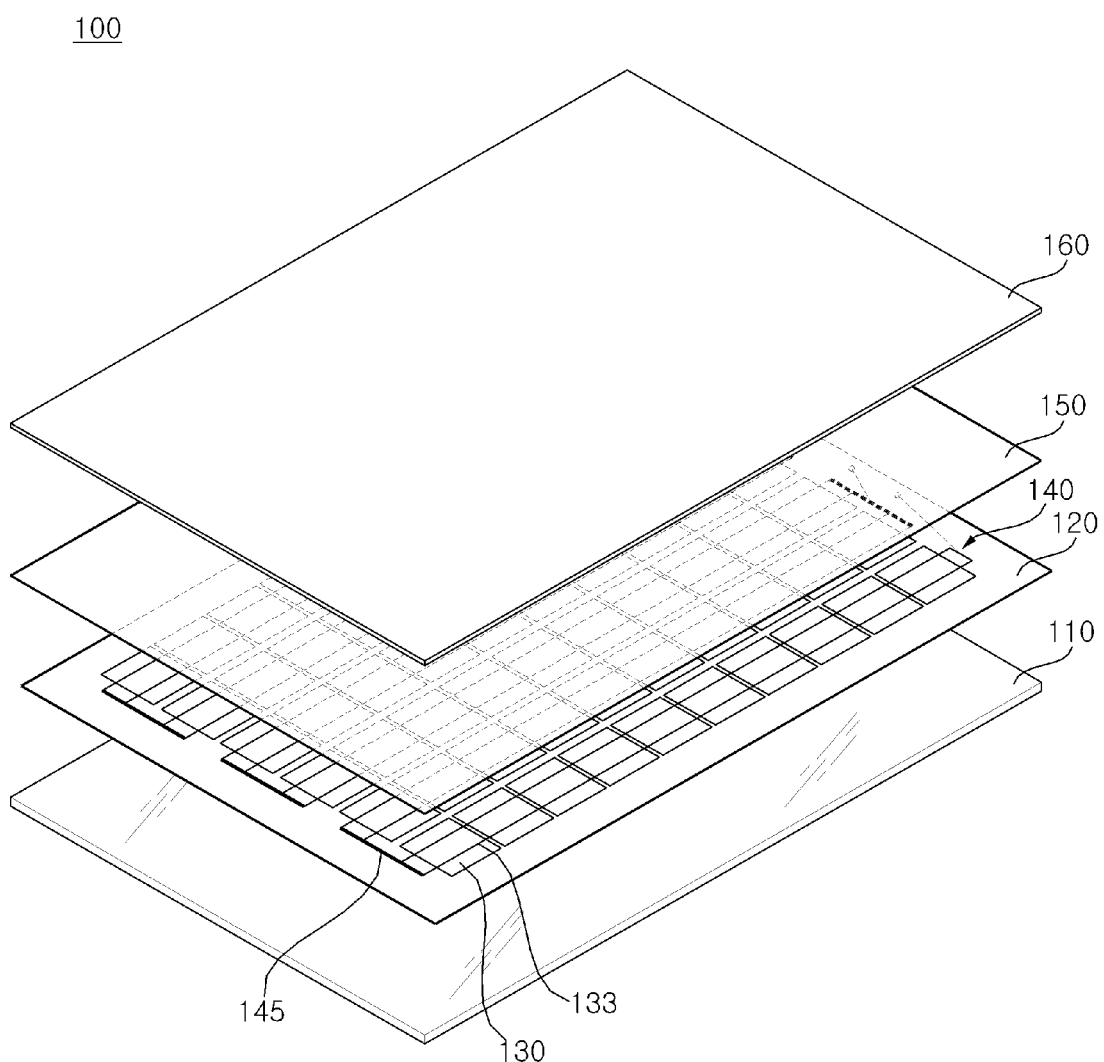
FIG. 7 is an exploded perspective view illustrating a solar cell module illustrated in FIG. 2.

FIG. 7 is an exploded perspective view illustrating the solar cell module illustrated in FIG. 2.

Referring to FIG. 7, the solar cell module 100 may include the solar cells 130 and bus ribbons 145. In addition, the solar cell module 100 may further include a first sealing member 120 and a second sealing member 150, which are disposed on the lower surface and the upper surface of the solar cells 130, a back substrate 110 disposed on the lower surface of the first sealing member 120, and a front substrate 160 disposed on the upper surface of the second sealing member 150.

First, the solar cells 130 are semiconductor devices that convert solar energy into electrical energy, and may be, for example, silicon solar cells, compound semiconductor solar cells, tandem solar cells, dye sensitized solar cells, or CdTe or CIGS type solar cells.

Each of the solar cells 130 includes a light-receiving surface on which sunlight is incident and a back surface opposite to the light-receiving surface. For example, the solar cell 130 may include a first conductive silicon substrate, a second conductive semiconductor layer formed on the silicon substrate, the second conductive type being contrary to the first conductive type, an anti-reflection film formed on the second conductive semiconductor layer and having at least one opening for exposing a surface portion of the second conductive semiconductor layer, a front electrode formed in contact with the surface portion of the second conductive semiconductor layer exposed through the opening, and a back electrode formed on the back surface of the silicon substrate.

The respective solar cells 130 may be electrically connected in series, in parallel, or in series-parallel combination to one another. Specifically, the solar cells 130 may be electrically connected to one another using a ribbon 133. The ribbon 133 may be bonded to the front electrode formed on the light-receiving surface of one solar cell 130 and the back electrode formed on the back surface of another neighboring solar cell 130.

FIG. 7 illustrates that two rows of ribbons 133 are provided and the solar cells 130 are connected to one another in a line by the ribbons 133 to form a solar cell string 140. Thereby, as illustrated in FIG. 7, six solar cell strings 140a, 140b, 140c, 140d, 140e and 140f are formed, and each string consists of ten solar cells. However, various alterations, unlike FIG. 7, are possible.

The back substrate 110 may be a back sheet having waterproof, insulation, and ultraviolet (UV) blocking functions, and may be of a Tedlar/PET/Tedlar (TPT) type, without being limited thereto. In addition, while the back substrate 110 is illustrated in FIG. 7 as having a rectangular shape, the back substrate 110 may be fabricated into various other shapes, such as circular and semicircular shapes, according to the environment in which the solar cell module 100 is installed.

Meanwhile, the first sealing member 120 may be attached to the back substrate 110 so as to have the same size as the back substrate 110, and the solar cells 130 may be arranged next to one another so as to form a plurality of lines on the first sealing member 120.

The second sealing member 150 may be disposed over the solar cells 130 and may be bonded to the first sealing member 120 via lamination.

Here, the first sealing member 120 and the second sealing member 150 enable a chemical bond of respective elements of the solar cells 130. The first sealing member 120 and the second sealing member 150 may be formed of any one of various materials, such as ethylene vinyl acetate (EVA) films.

Meanwhile, the front substrate 160 may be disposed on the second sealing member 150 so as to permit passage of sunlight therethrough. The front substrate 160 may be formed of tempered glass in order to protect the solar cells 130 from external shocks, etc. In addition, in order to prevent or reduce reflection of sunlight and to enhance light-transmittance, the front substrate 160 may be formed of low-iron tempered glass.

Figure 8:
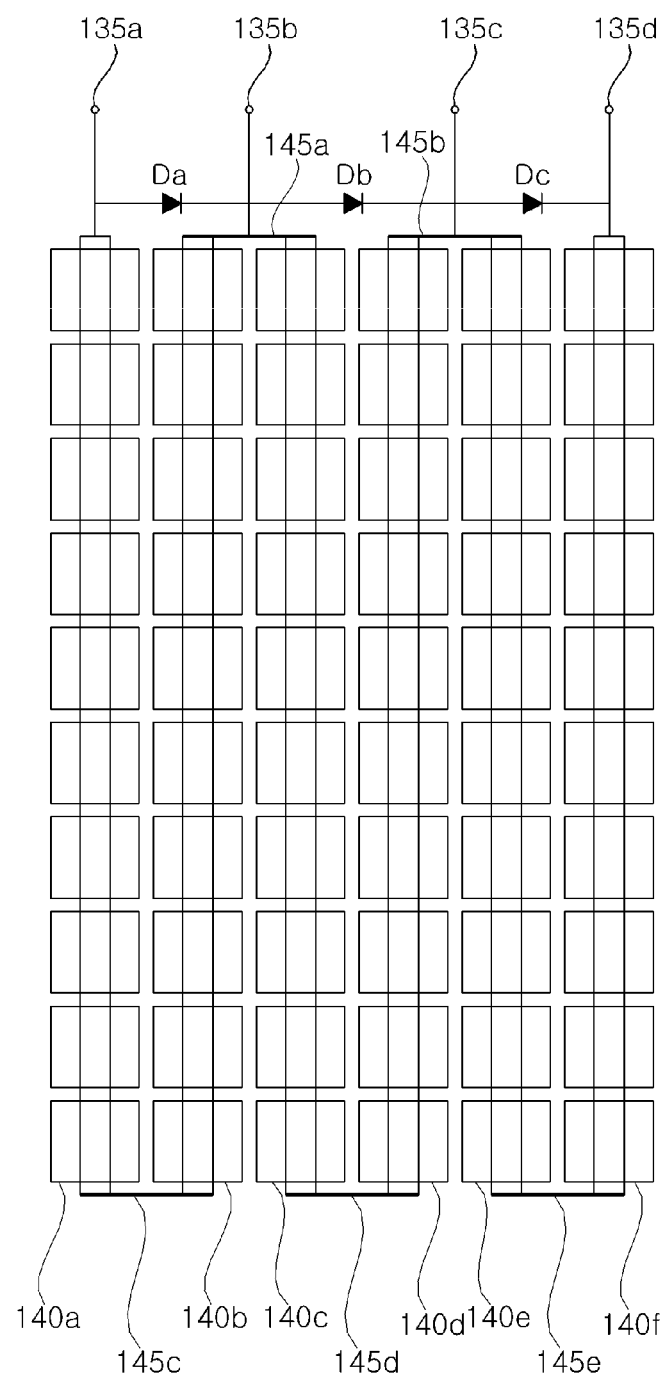
FIG. 8 is a view illustrating one example configuration of bypass diodes in the photovoltaic module illustrated in FIG. 2.

FIG. 8 is a view illustrating one example configuration of bypass diodes in the photovoltaic module illustrated in FIG. 2.

Referring to FIG. 8, bypass diodes Da, Db and Dc may be connected so as to correspond to the six solar cell strings 140a, 140b, 140c, 140d, 140e and 140f. Specifically, the first bypass diode Da is connected between the first solar cell string 140a and a first bus ribbon 145a so as to bypass the first solar cell string 140a and the second solar cell string 140b when a reverse voltage is generated in the first solar cell string 140a or the second solar cell string 140b.

For example, when a voltage of approximately 0.6 V is generated from a normal solar cell, the potential of a cathode of the first bypass diode Da is greater than the potential of an anode by approximately 12 V (=0.6 V*20). That is, the first bypass diode Da performs a normal operation rather than performing a bypassing operation.

On the other hand, when a hot spot occurs at any one solar cell of the first solar cell string 140a due to shading of the solar cell or attachment of a foreign substance to the solar cell, a reverse voltage (approximately −15 V), rather than a voltage of approximately 0.6 V, is generated from the corresponding solar cell. As such, the potential of the anode of the first bypass diode Da is greater than the potential of the cathode by approximately 15 V, and the first bypass diode Da performs a bypassing operation. Accordingly, voltages generated by the solar cells of the first solar cell string 140a and the second solar cell string 140b are not supplied to the junction box 200. When reverse voltages are generated by some solar cells, bypassing the solar cells may prevent the solar cells from being damaged. In addition, a generated DC voltage may be supplied in areas other than a hot spot area.

Next, the second bypass diode Db is connected between the first bus ribbon 145a and a second bus ribbon 145b so as to bypass the third solar cell string 140c and the fourth solar cell string 140d when a reverse voltage is generated in the third solar cell string 140c or the fourth solar cell string 140d.

Next, the third bypass diode Dc is connected between the six solar cell string 140f and the second bus ribbon 145b so as to bypass the fifth solar cell string 140e and the sixth solar cell string 140f when a reverse voltage is generated in the fifth solar cell string 140e or the sixth solar cell string 140f.

Meanwhile, unlike FIG. 8, six bypass diodes may be connected so as to correspond to the six solar cell strings, and various other alterations are possible.

Alternatively, the respective solar cell strings may be electrically connected to one another using bus ribbons. FIG. 8 illustrates that the third to the fifth bus ribbons 145c, 145d and 145e, which are located at the bottom of the solar cell module 100, achieve electrical connection between the first solar cell string 140a and the second solar cell string 140b, between the third solar cell string 140c and the fourth solar cell string 140d, and between the fifth solar cell string 140e and the sixth solar cell string 140f respectively. In addition, FIG. 8 illustrates that the first and the second bus ribbons 145a and 145b, which are located at the top of the solar cell module 100, achieve electrical connection between the second solar cell string 140b and the third solar cell string 140c and between the fourth solar cell string 140d and the fifth solar cell string 140e respectively.

Meanwhile, the ribbon connected to the first string 140a, the bus ribbons 145a and 145b, and the ribbon connected to the sixth string 140f are electrically connected to first to fourth conductive lines 135a, 135b, 135c and 135d respectively, and the first to fourth conductive lines 135a, 135b, 135c and 135d are connected to the bypass diodes Da, Db and Dc inside the junction box 200, which is disposed on the back surface of the solar cell module 100. The first to fourth conductive lines 135a, 135b, 135c and 135d may extend to the back surface of the solar cell module 100 through openings formed in the solar cell module 100.

Meanwhile, the junction box 200 may be located closer to one end of the solar cell module 100 from which the conductive lines extend.

Figure 9:
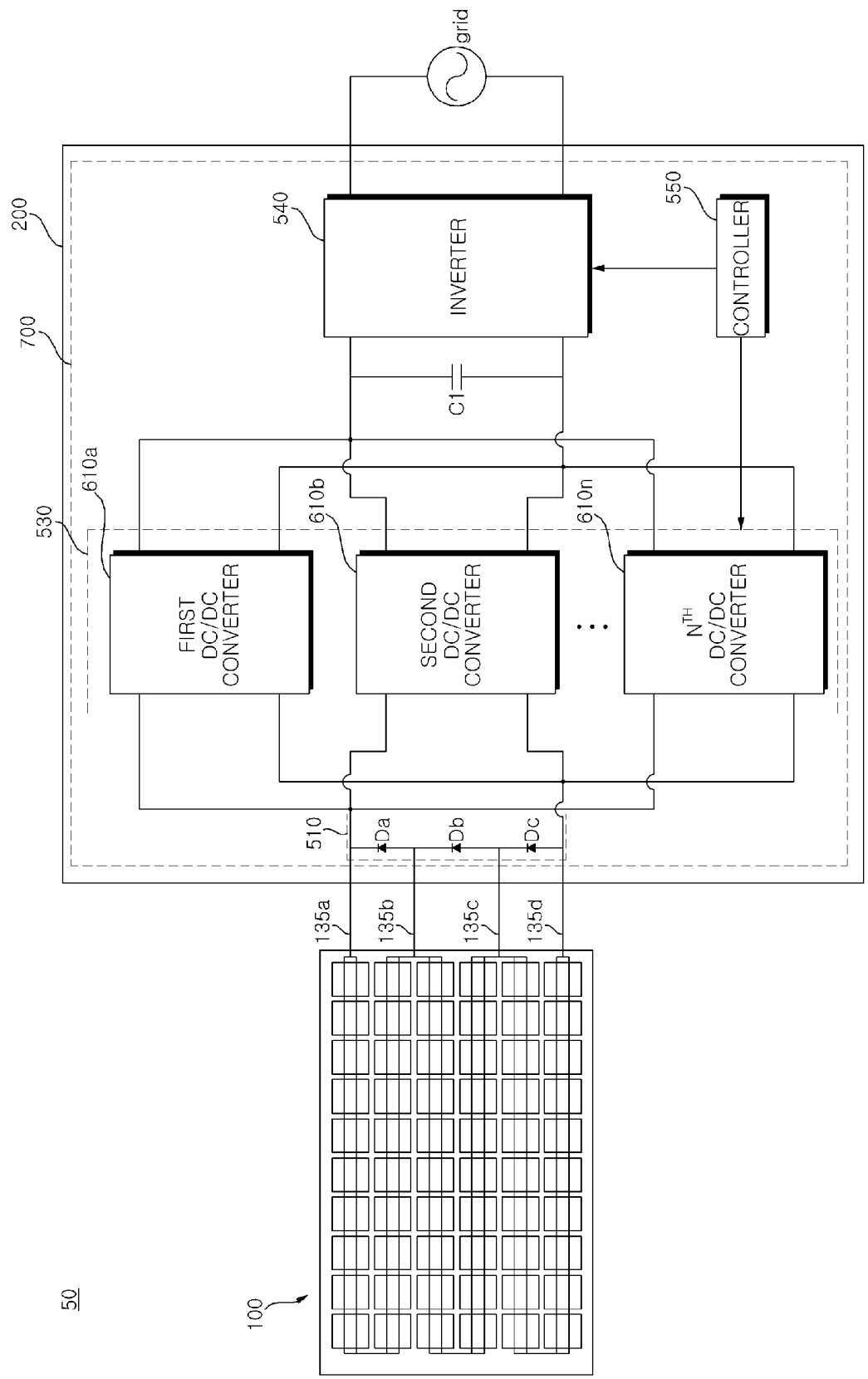
FIG. 9 is a block diagram illustrating one example internal configuration of a junction box illustrated in FIG. 2.

FIG. 9 is a block diagram illustrating one example internal configuration of the junction box illustrated in FIG. 2.

Referring to FIG. 9, a power conversion module 700 inside the junction box 200 may include the bypass diode unit 510, the converter unit 530, the capacitor C1, the inverter 540, and the controller 550.

The bypass diode unit 510 may include the bypass diodes Dc, Db and Da located respectively between the first to fourth conductive lines 135a, 135b, 135c and 135d. At this time, the number of the bypass diodes may be one or more, and may be less than the number of the conductive lines by one.

The bypass diodes Dc, Db and Da receive a photovoltaic DC voltage from the solar cell module 100, more particularly, from the first to fourth conductive lines 135a, 135b, 135c and 135d inside the solar cell module 100. When a reverse voltage is generated from at least one of the first to fourth conductive lines 135a, 135b, 135c and 135d, the bypass diodes Dc, Db, Da may bypass the solar cell corresponding thereto.

Meanwhile, an input voltage Vpv, having passed through the bypass diode unit 510, is input to the converter unit 530.

The converter unit 530 converts the input voltage Vpv from the bypass diode unit 510. For this reason, the converter unit 530 may be referred to as a first power conversion unit.

In one example, the converter unit 530 may convert a DC input voltage Vpv into a pseudo DC voltage. As such, the pseudo DC voltage may be stored in the capacitor C1. Both terminals of the capacitor C1 may be referred to as DC terminals, and the capacitor C1 may be referred to as a DC terminal capacitor.

In another example, the converter unit 530 may boost the DC input voltage Vpv to convert the same into a boosted DC voltage. As such, the boosted DC voltage may be stored in the DC terminal capacitor C1.

The inverter 540 may convert the DC voltage stored in the DC terminal capacitor C1 into an AC voltage. For this reason, the inverter 540 may be referred to as a second power conversion unit.

In one example, the inverter 540 may convert the pseudo DC voltage from the converter unit 530 into an AC voltage.

In another example, the inverter 540 may convert the boosted DC voltage from the converter unit 530 into an AC voltage.

The converter unit 530 may include a plurality of interleaving converters for pseudo DC voltage conversion or boosted DC voltage conversion.

In particular, the embodiment of the present invention assumes that the converter unit 530 including three or more interleaving converters.

FIG. 9 illustrates that n converters 610a, 610b, . . . , 610n are connected in parallel to one another. The n converters 610a, 610b, . . . , 610n may have the same energy conversion capacity.

Current by the DC input voltage Vpv is reduced to 1/N in the n converters 610a, 610b, . . . , 610n, and output current of the respective converters 610a, 610b, . . . , 610n is summed into one at output terminals of the n converters 610a, 610b, . . . , 610n.

Meanwhile, the n converters 610a, 610b, . . . , 610n perform an interleaving operation in a state in which the current phase of each of the converters 610a, 610b, . . . , 610n has a phase delay of +(360°/N), −(360°/N) relative to a reference phase, or a phase delay close thereto.

When the n converters perform an interleaving operation as described above, a ripple of input current and output current of the converter unit 530 is reduced, which advantageously results in a reduction in the capacity and size of circuit elements in the power conversion module 700. In this way, the thickness of the junction box 200 may be reduced compared to the thickness of the frame 105 of the solar cell module 100.

Meanwhile, the interleaving converters may be, for example, tapped inductor converters or flyback converters.

Figure 10A:
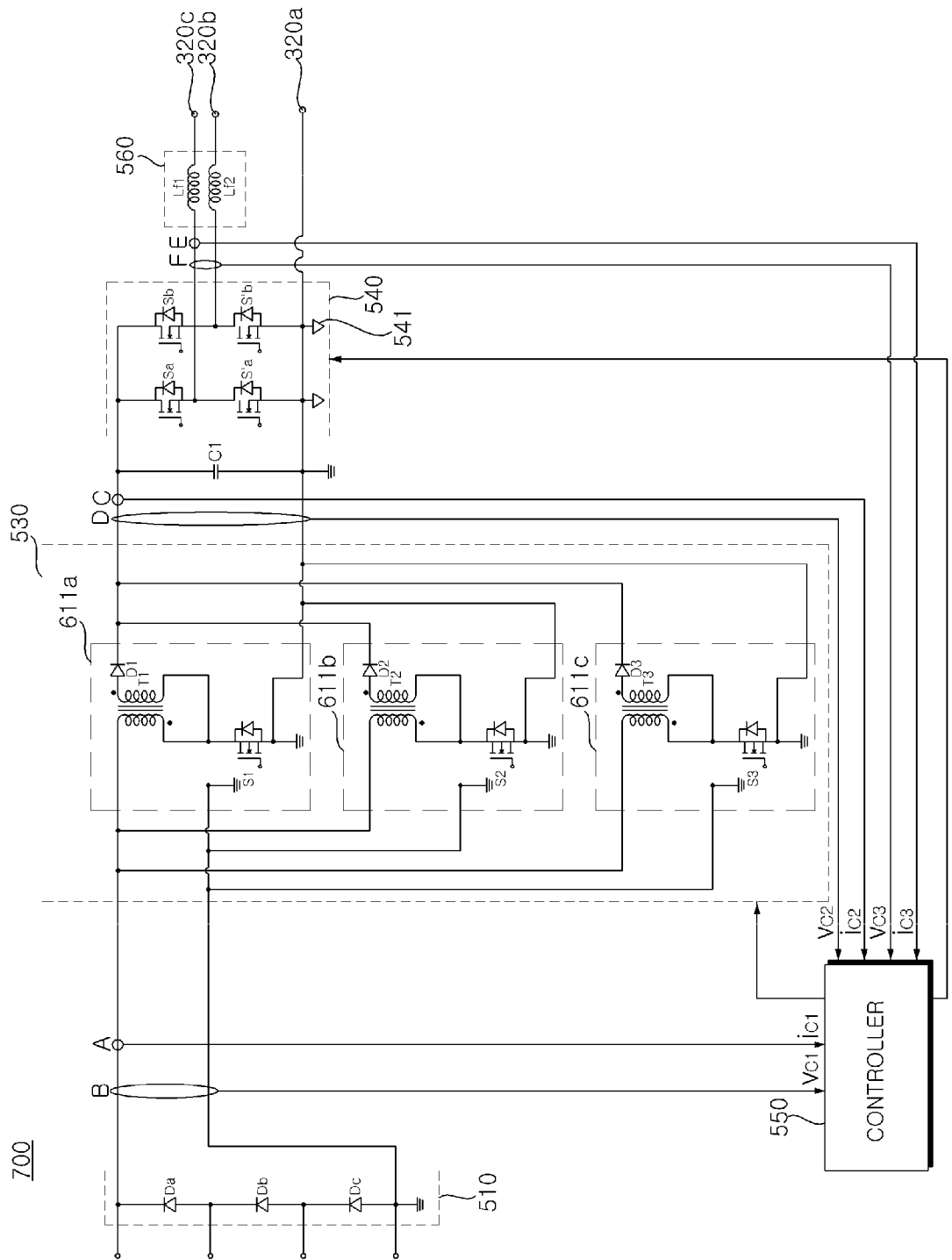
FIG. 10A is a circuit diagram illustrating one example internal circuit of a power conversion module illustrated in FIG. 9.

FIG. 10A is a circuit diagram illustrating one example internal circuit of the power conversion module illustrated in FIG. 9.

FIG. 10A illustrates that the interleaving converters are tapped inductor converters, and that the converter unit 530 includes a first tapped inductor converter to a third tapped inductor converter 611a, 611b and 611c.

The bypass diode unit 510 includes the first to third bypass diodes Da, Db and Dc, which are arranged respectively between an "a" node, a "b" node, a "c" node, and a "d" node, which respectively correspond to the first to fourth conductive lines 135a, 135b, 135c and 135d.

The converter unit 530 may perform power conversion using a DC voltage Vpv output from the bypass diode unit 510.

In particular, each of the first to third tapped inductor converters 611a, 611b and 611c outputs a converted DC voltage to the DC terminal capacitor C1 via an interleaving operation.

Among these tapped inductor converters, the first tapped inductor converter 611a includes a tapped inductor T1, a switching element S1 connected between the tapped inductor T1 and a ground terminal, and a diode D1 connected to an output terminal of the tapped inductor T1 to perform one-way conduction. Meanwhile, the DC terminal capacitor C1 is connected between an output terminal of the diode D1, namely, a cathode and the ground terminal.

Specifically, the switching element S1 may be connected between a tap of the tapped inductor T1 and the ground terminal. In addition, the output terminal (secondary side) of the tapped inductor T is connected to an anode of the diode D1, and the DC terminal capacitor C1 is connected between the cathode of the diode D1 and the ground terminal.

Meanwhile, the primary side and the secondary side of the tapped inductor T1 have opposite polarities. The tapped inductor T1 may be referred to as a switching transformer.

Meanwhile, the primary side and the secondary side of the tapped inductor T1 are connected to each other as illustrated in FIG. 10A. For this reason, the tapped inductor converter may be a non-insulated type converter.

Meanwhile, when the three tapped inductor converters 611a, 611b and 611c are connected in parallel to one another so as to operate in an interleaving manner as illustrated in FIG. 10A, input current is diverged in parallel, which reduces a ripple of current components output through the respective tapped inductor converters 611a, 611b and 611c.

Meanwhile, the respective tapped inductor converters 611a, 611b and 611c may be adaptively operated so as to correspond to required power values of an output AC voltage.

For example, the first tapped inductor converter 611a may be operated alone when a required power value ranges from approximately 90 W to approximately 130 W, both the first and second tapped inductor converters 611a and 611b may be operated when a required power value ranges from approximately 190 W to approximately 230 W, and all of the first to third tapped inductor converters 611a, 611b and 611c may be operated when a required power value ranges from approximately 290 W to approximately 330 W. That is, the respective tapped inductor converters 611a, 611b and 611c may be selectively operated. This selective operation may be controlled by the controller 550.

The inverter 540 converts a level-converted DC voltage from the converter unit 530 into an AC voltage. The inverter 540 is illustrated as a full-bridge inverter in FIG. 10A. That is, upper-arm switching elements Sa and Sb and lower-arm switching elements S'a and S'b connected in series are paired, and a total of two pairs of upper-arm and lower-arm switching elements Sa & S'a and Sb & S'b are connected in parallel. A diode is connected to each of the switching elements Sa, S'a, Sb and S'b in inverse parallel.

The switching elements inside the inverter 540 are turned on/off based on an inverter switching control signal from the controller 550. As such, an AC voltage having a prescribed frequency is output from the inverter 540. The output AC voltage may have the same AC frequency (ranging from approximately 60 Hz to approximately 50 Hz) as the AC frequency of a grid.

A filter unit 560 performs low-pass filtering in order to smooth the AC voltage output from the inverter 540. To this end, although the filter unit 560 is illustrated in FIG. 10A as including inductors Lf1 and Lf2, various examples are possible.

Meanwhile, a converter input current detector A detects input current ic1 to the converter unit 530, and a converter input voltage detector B detects an input voltage vc1 to the converter unit 530. The detected input current ic1 and input voltage vc1 may be input to the controller 550.

Meanwhile, a converter output current detector C detects output current ic2 from the converter unit 530, namely, DC-terminal current, and a converter output voltage detector D detects an output voltage vc2 from the converter unit 530, namely a DC-terminal voltage. The detected output current ic2 and output voltage vc2 may be input to the controller 550.

Meanwhile, an inverter output current detector E detects output current ic3 from the inverter 540, and an inverter output voltage detector F detects an output voltage vc3 from the inverter 540. The detected current ic3 and voltage vc3 may be input to the controller 550.

Meanwhile, the controller 550 may output a control signal to control the switching element S1 in the converter unit 530 illustrated in FIG. 10A. In particular, the controller 550 may output a turn-on timing signal for the switching element S1 in the converter unit 530 based on at least one of the detected input current ic1, input voltage vc1, output current ic2, output voltage vc2, output current ic3 and output voltage vc3.

Meanwhile, the controller 550 may output an inverter control signal to control each of the switching elements Sa, S'a, Sb and S'b in the inverter 540. In particular, the controller 550 may output a turn-on timing signal for each of the switching elements Sa, S'a, Sb and S'b in the inverter 540 based on at least one of the detected input current ic1, input voltage vc1, output current ic2, output voltage vc2, output current ic3, and output voltage vc3.

Meanwhile, the controller 550 may calculate the maximum power point of the solar cell module 100, and may control the converter unit 530 so as to output a DC voltage corresponding to the maximum power.

Meanwhile, the ground terminal 541 of the inverter 540 is electrically connected to the ground line 320a of the cable 320, a first line, among output lines, of the filter unit 560 is electrically connected to the first power line 320b of the cable 320, and a second line, among the output lines, of the filter unit 560 is electrically connected to the second power line 320c of the cable 320.

Figure 10B:
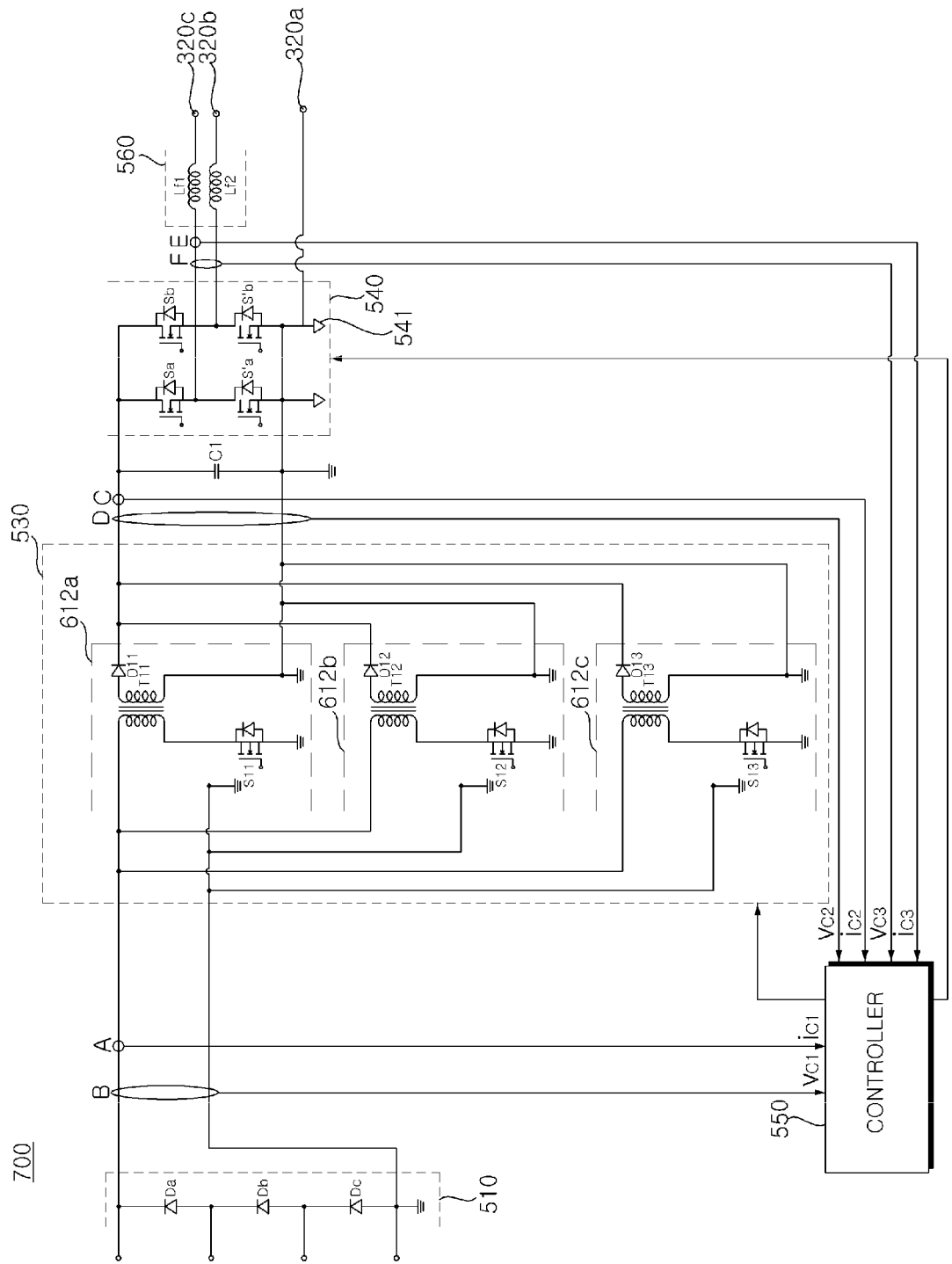
FIG. 10B is a circuit diagram illustrating another example internal circuit of the power conversion module illustrated in FIG. 9.

FIG. 10B is a circuit diagram illustrating another example internal circuit of the power conversion module illustrated in FIG. 9.

In the same manner as in the power conversion module 700 of FIG. 10A, the power conversion module 700 of FIG. 10B may include the bypass diode unit 510, the converter unit 530, the DC terminal capacitor C1, the inverter 540, the controller 550, and the filter unit 560.

However, FIG. 10B illustrates that a flyback converter is used as the interleaving converter in the converter unit 530, and that the converter unit 530 includes first to third flyback converters 612a, 612b and 612c.

In particular, the first to third flyback converters 612a, 612b and 612c are insulated type converters, unlike the non-insulated type tapped inductor converters, and each of the first to third flyback converters 612a, 612b and 612c outputs a converted DC voltage to the DC terminal capacitor C1 via an interleaving operation.

Among these flyback converters, the first flyback converter 612a includes a transformer T11, a switching element S11 connected between the primary side of the transformer T11 and a ground terminal, and a diode D11 connected to the secondary side of the transformer T11 to perform one-way conduction. Meanwhile, the DC terminal capacitor C1 is connected between an output terminal of the diode D1, namely, a cathode and the ground terminal. The primary side and the secondary side of the transformer T11 have opposite polarities.

Meanwhile, the ground terminal 541 of the inverter 540 is electrically connected to the ground line 320a of the cable 320, the first line, among the output lines, of the filter unit 560 is electrically connected to the first power line 320b of the cable 320, and the second line, among the output lines, of the filter unit 560 is electrically connected to the second power line 320c of the cable 320.

Figure 11A:
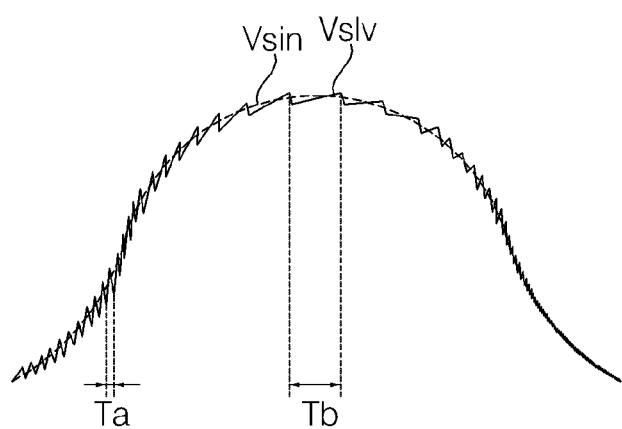
FIGS. 11A and 11B are views referenced to describe the output of a pseudo DC voltage using an input voltage from a converter unit illustrated in FIG. 9.
Figure 11B:
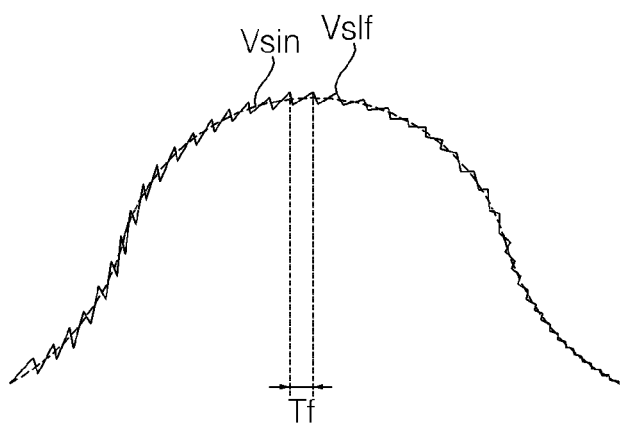

FIGS. 11A and 11B are views referenced to describe the output of a pseudo DC voltage using an input voltage from the converter unit illustrated in FIG. 9.

Referring to FIG. 11A, each of the first to third interleaving converters 610a, 610b and 610c in the converter unit 530 outputs a pseudo DC voltage using an input DC voltage Vpv.

Specifically, the converter unit 530 outputs a pseudo DC voltage, having a peak value of approximately 330 V, using a DC voltage, which ranges from approximately 32V to approximately 36V, from the solar cell module 100.

To this end, the controller 550 determines duties of the switching elements in the first to third interleaving converters 610a, 610b and 610c based on the detected input voltage Vpv and the detected output voltage Vdc.

In particular, as the input voltage Vpv is reduced, the duties of the switching elements in the first to third interleaving converters 610a, 610b and 610c are increased. As the input voltage Vpv is increased, the duties of the switching elements are reduced.

Meanwhile, as the target output voltage Vdc is reduced, the duties of the switching elements in the first to third interleaving converters 610a, 610b and 610c are reduced. As the target output voltage Vdc is increased, the duties of the switching elements are increased. For example, the duties of the switching elements may become the maximum when the target output voltage Vdc has a peak value of approximately 330 V.

FIG. 11A illustrates a pseudo DC voltage waveform Vslv output by duty variation as described above, and illustrates that the pseudo DC voltage waveform follows a target sinusoidal waveform V sin.

Meanwhile, in order to allow a pseudo DC voltage waveform Vslo to more accurately follow a full-wave rectified waveform V sin, the embodiment of the present invention assumes that the switching frequency of the converter unit 530 is variable.

As illustrated in FIG. 11B, an error ΔE2 between a pseudo DC voltage waveform Vslf and the target sinusoidal waveform V sin when the switching frequency of the converter unit 530 is fixed is greater than an error ΔE1 between the pseudo DC voltage waveform Vslv and the target sinusoidal waveform V sin when the switching frequency of the converter unit 530 is varied as illustrated in FIG. 11A.

In order to reduce the above-described error, in the embodiment of the present invention, the switching frequency of the converter unit 530 is varied. That is, the switching frequencies of the switching elements in the first to third interleaving converters 610a, 610b and 610c are varied.

The controller 550 may control the converter unit 530 in such a manner that the switching frequency of the converter unit 530 is increased as the rate of variation of the target sinusoidal waveform V sin increases, and that the switching frequency of the converter unit 530 is reduced, as the rate of variation of the target sinusoidal waveform V sin is reduced.

FIG. 11A illustrates that the switching period of the converter unit 530 is set to Ta in a rising section of the target sinusoidal waveform V sin, and the switching period of the converter unit 530 is also set to Tb, which is greater than Ta, in a peak section of the target sinusoidal waveform V sin. That is, FIG. 11A illustrates that the switching frequency corresponding to the switching period Ta is greater than the switching frequency corresponding to the switching period Tb. This setting may reduce the error ΔE1 between the pseudo DC voltage waveform Vslv and the target sinusoidal waveform V sin.

Meanwhile, variation in the switching frequency of FIG. 11A may be described using a switching mode of the switching element. This will be described below with reference to FIGS. 12 and 13.

Figure 12:
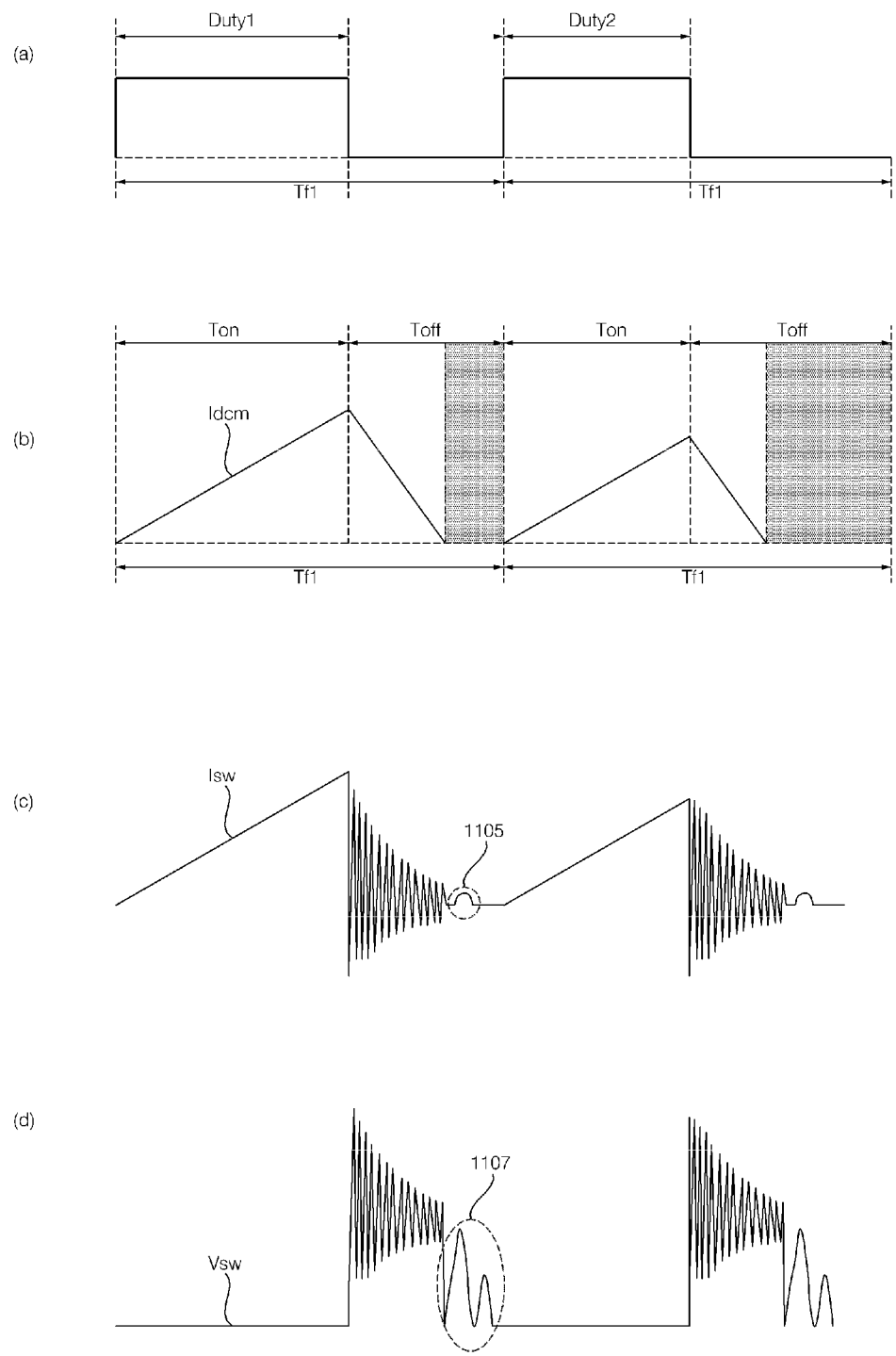
FIGS. 12 and 13 are views referenced to describe variation in switching frequency depending on the switching mode of a switching element.
Figure 13:
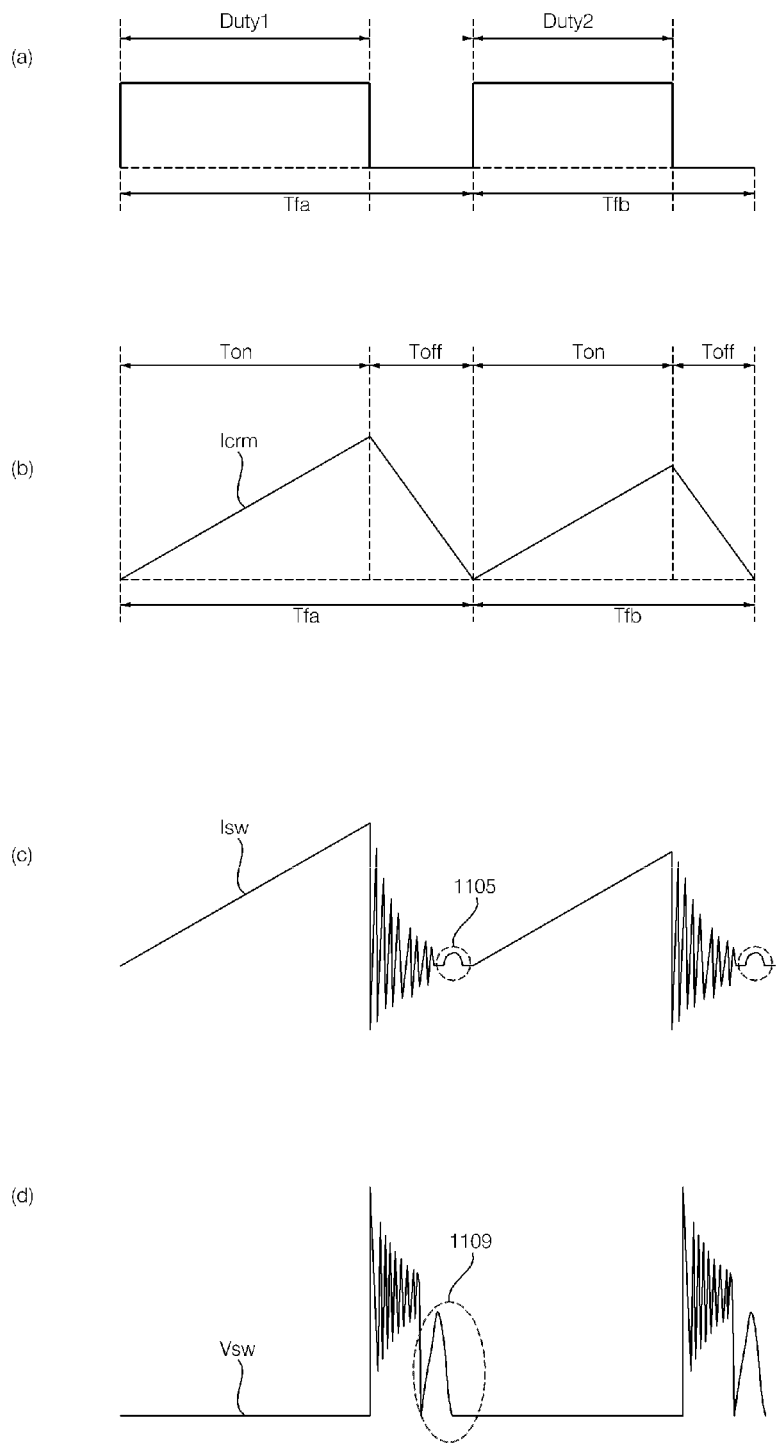

FIGS. 12 and 13 are views referenced to describe variation in the switching frequency depending on the switching mode of a switching element.

First, (a) of FIG. 12 illustrates one example of the duty waveform diagram of the switching element in the interleaving converter. Referring to (a) of FIG. 12, the switching element is turned on during a first duty Duty1 within a first switching period Tf1, and thereafter is turned off. Then, the switching element is turned on during a second duty Duty2 within a second switching period Tf2, and thereafter is turned off. (a) of FIG. 12 illustrates that the first duty Duty1 is greater than the second duty Duty2.

Meanwhile, (a) of FIG. 12 illustrates that the switching period of the interleaving converter is fixed and a discontinuous conduction mode (DCM) is applied as the switching mode.

When the switching period of the interleaving converter is fixed and the DCM is applied as the switching mode, a waveform Idcm of current flowing through the switching element may be exemplified as illustrated in (b) of FIG. 12. Current flowing through the switching element is increased as the switching element is turned on, and then is reduced as the switching element is turned off.

(c) of FIG. 12 illustrates the waveform of actual current Isw flowing through the switching element in the interleaving converter depending on the DCM, and (d) of FIG. 12 illustrates a switching voltage Vsw at both terminals of the switching element in the interleaving converter depending on the DCM.

Meanwhile, a resonance section 1105 in the interleaving converter may occur after the switching element is turned off and before a next switching period is commenced. At this time, when the switching element is operated in the DCM, a section 1107 in which a switching voltage at both terminals of the switching element does not become zero occurs. Accordingly, zero voltage switching (ZVS) with respect to the switching element cannot be performed, which causes deterioration in the efficiency of the interleaving converter.

To solve the above-described problem, in the embodiment of the present invention, a critical conduction mode (CRM), rather than the DCM, is used as the switching mode. The CRM may be referred to as a boundary conduction mode (BCM) or a transition mode (TM).

The CRM refers to a mode in which a new switching period is commenced whenever current flowing through the switching element becomes zero after the switching element of the interleaving converter is turned off. As such, through the CRM method, the switching period may be varied according to the duty within the switching period.

(a) of FIG. 13 illustrates one example of the duty waveform diagram of the switching element in the interleaving converter. Referring to (a) of FIG. 13, the switching element is turned on during a first duty Duty1 within a first switching period Tfa, and thereafter is turned off. Then, the switching element is turned on during a second duty Duty2 within a second switching period Tfb, and thereafter is turned off. (a) of FIG. 13 illustrates that the first duty Duty1 is greater than the second duty Duty2.

Meanwhile, (a) of FIG. 13 illustrates that the CRM using a variable switching frequency is applied as the switching mode of the switching element in the interleaving converter according to variation in duty.

When the CRM using a variable switching frequency is applied as the switching mode, the waveform Icrm of current flowing through the switching element may be exemplified as illustrated in (b) of FIG. 13. Current flowing through the switching element is increased as the switching element is turned on, and then is reduced as the switching element is turned off. When current flowing through the switching element becomes zero, namely, when the zero crossing arrives, a new switching period is commenced.

(c) of FIG. 13 illustrates the waveform of actual current Isw flowing through the switching element in the interleaving converter depending on the CRM, and (d) of FIG. 13 illustrates a switching voltage Vsw at both terminals of the switching element in the interleaving converter depending on the CRM.

Meanwhile, the resonance section 1105 in the interleaving converter may occur after the switching element is turned off. At this time, when the switching element is operated in the CRM, despite occurrence of the resonance section 1105 and 1109, a timing when current flowing through the switching element becomes zero may be determined, and the switching element may be turned on at the timing when the zero crossing arrives. That is, a new switching period may be commended. In this way, zero voltage switching (ZVS) with respect to the switching element may be performed, which enhances the efficiency of the interleaving converter.

In this way, in the embodiment of the present invention, the switching frequency of the switching element in the interleaving converter is varied based on the CRM.

Meanwhile, when the three interleaving converters 610a, 610b and 610c are used, the first to third interleaving converters 610a, 610b and 610c may be operated while having phase differences respectively.

At this time, in the instance where a constant phase difference, e.g., 120 degrees, is set with respect to operating sections of the first to third interleaving converters 610a, 610b and 610c under the application of variation in switching frequency, output power may be deteriorated when the switching periods are increased. This will be described below with reference to FIGS. 14 and 15.

Figure 14:
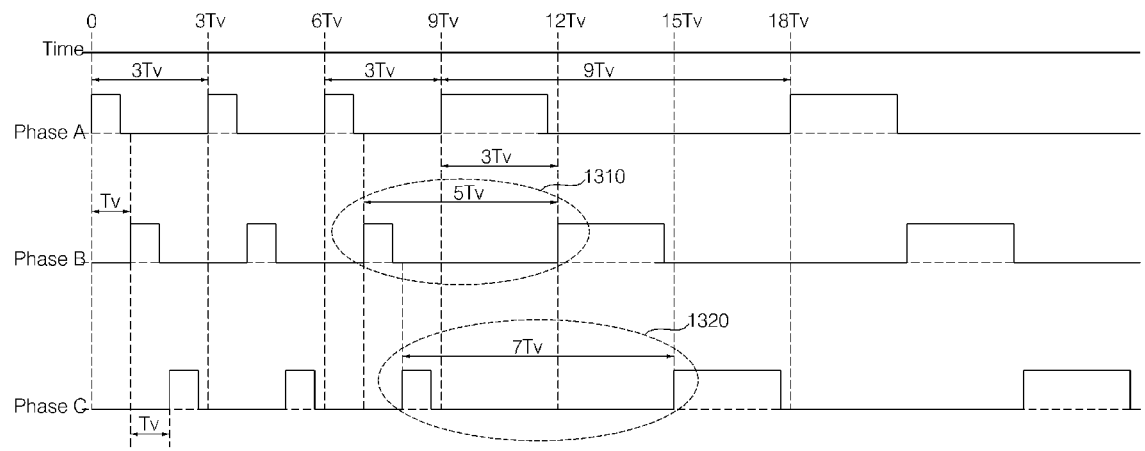
FIG. 14 is a view illustrating the instance where three interleaving converters have variable switching frequencies and fixed phase differences.

FIG. 14 illustrates the instance where the three interleaving converters 610a, 610b and 610c have variable switching frequencies and fixed phase differences.

Referring to FIG. 14, it can be appreciated that the switching periods of the three interleaving converters 610a, 610b and 610c are fixed to 3 Tv during a time section from the point in time of 0 to the point in time of 9 Tv, and differences between the phases Phase A, Phase B and Phase C of the three interleaving converters 610a, 610b and 610c are fixed to 1 Tv.

As illustrated, the switching periods of the three interleaving converters 610a, 610b and 610c are varied at the point in time of 9 Tv so as to be increased, by three times, to 9 Tv. In this instance, the first interleaving converter is operated during a time section of 3 Tv after the previous switching period of 3 Tv, whereas the second interleaving converter is operated during a time section of 3 Tv after a time section of 5 Tv has passed from the previous switching period in consideration of the varied duty (3 Tv) of the first interleaving converter. The third interleaving converter is operated during a time section of 3 Tv after a time section of 7 Tv has passed from the previous switching period in consideration of the varied duty 3 Tv of the second interleaving converter.

At this time, the phase differences between the first interleaving converter to the third interleaving converter 610a, 610b and 610c are respectively fixed to 120 degrees despite variation in the switching period. That is, after the first interleaving converter is operated, the second interleaving converter and the third interleaving converter are operated respectively after a time section of 3 Tv and after a time section of 6 Tv.

In switching period variation sections 1310 and 1320 as described above, power output by each of the second interleaving converter and the third interleaving converter is reduced compared to the first interleaving converter. Thus, output current or output voltage of the converter unit 530 is instantaneously deteriorated.

To solve this problem, in the embodiment of the present invention, when the switching periods of the interleaving converters are varied, phases of the operating sections of the interleaving converters are varied in order to avoid output unbalance between the interleaving converters. This will be described below with reference to FIG. 15.

Figure 15:
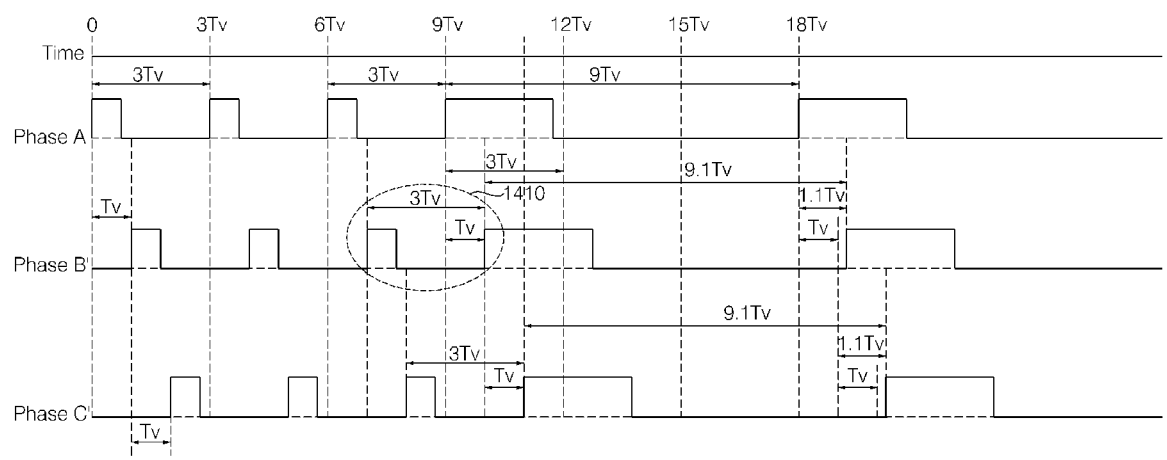
FIG. 15 is a view illustrating the instance where three interleaving converters have variable switching frequencies and variable phase differences.

FIG. 15 illustrates the instance where the three interleaving converters 610a, 610b and 610c have variable switching frequencies and variable phase differences.

Referring to FIG. 15, it can be seen that the switching periods of the three interleaving converters 610a, 610b and 610c are fixed to 3 Tv during a time section from the point in time of 0 to the point in time of 9 Tv, and differences between the phases Phase A, Phase B and Phase C of the three interleaving converters 610a, 610b and 610c are fixed to 1 Tv.

As illustrated, the switching periods of the three interleaving converters 610a, 610b and 610c are varied at the point in time of 9 Tv so as to be increased, by three times, to 9 Tv. In this instance, the first interleaving converter is operated during a time section of 3 Tv after the previous switching period of 3 Tv, and in a switching period variation section 1410, the second interleaving converter may be operated during a time section of 3 Tv after a time section of 1 TV has passed from the switching period variation point in time of 9 Tv, and the third interleaving converter may be operated during a time section of 3 Tv after a time section of 2 Tv has passed from the switching period variation point in time of 9 Tv.

That is, unlike FIG. 14, the controller 550 varies phase differences between the first interleaving converter to the third interleaving converter 610a, 610b and 610c to correspond to the varied switching periods. As illustrated in FIG. 15, the phase difference between the first interleaving converter 610a and the second interleaving converter 610b and the phase difference between the second interleaving converter 610b and the third interleaving converter 610c are varied from 120 degrees to 40 degrees.

The controller 550 may vary the phases of the first to third interleaving converters 610a, 610b and 610c so as to reduce the phase differences between the respective interleaving converters 610a, 610b and 610c when the switching periods of the first to third interleaving converters 610a, 610b and 610c are increased. Similarly, the controller 550 may vary the phases of the first to third interleaving converters 610a, 610b and 610c so as to increase the phase differences between the respective interleaving converters 610a, 610b and 610c, for example, from 120 degrees to 130 degrees when the switching periods of the first to third interleaving converters 610a, 610b and 610c are reduced.

Meanwhile, the controller 550 may vary the phases of the first to third interleaving converters 610a, 610b, and 610c, more particularly, increase the phases of the first to third interleaving converters 610a, 610b, and 610c so as to generate a phase overlap region between the operating sections of the interleaving converters when the switching periods of the three interleaving converters 610a, 610b, and 610c are increased. FIG. 15 illustrates that the operating sections of the first interleaving converter and the second interleaving converter overlap during a time section of approximately 2 Tv.

Meanwhile, after the switching periods are varied, at the point in time of 18 Tv, the first interleaving converter is operated during a time section of 3 Tv after a time section of 9 Tv has passed from the previous switching period. On the other hand, the second interleaving converter may be operated during a time section of 3 Tv after a time section of 9.1 Tv has passed from the previous switching period, and the third interleaving converter may be operated during a time section of 3 TV after a time section of 9.1 Tv has passed from the previous switching period.

After the switching periods of the three interleaving converters 610a, 610b and 610c are varied, the controller 550 may sequentially vary phase differences between the first to third interleaving converters 610a, 610b and 610c so that the phase differences between the respective interleaving converters 610a, 610b and 610c are close to a reference phase difference. It can be appreciated from FIG. 15 that the phase difference between the first interleaving converter 610a and the second interleaving converter 610b and the phase difference between the second interleaving converter 610b and the third interleaving converter 610c are increased from 40 degrees to approximately 41 degrees after the point in time of 18 Tv.

As the phase differences between the first to third interleaving converters 610a, 610b, and 610c are sequentially varied so as to be close to an original reference phase difference, i.e. 120 degrees as described above, current distortion may be prevented or reduced and the above-described output power deterioration of the second interleaving converter and the third interleaving converter may be prevented or reduced.

Meanwhile, the phase variation as described above may be applied to the instance in which at least three interleaving converters are used. When two interleaving converters are used, phases of the interleaving converters may be fixed to 180 degrees as illustrated in FIG. 13.

Meanwhile, variation in the switching frequency and variation in the phase as described above with reference to FIGS. 11A to 15 may be applied to the converter unit 530 and, in particular, may be applied when the converter unit 530 includes tapped inductor converters or flyback converters.

The photovoltaic module and the photovoltaic system having the same according to the embodiment of the present invention may not be limitedly applied to the configuration and method of the embodiments as described above and, however, some or all of the embodiments may be selectively combined with one another to achieve various modifications.

As is apparent from the above description, a photovoltaic module according to an embodiment of the present invention includes a solar cell module, a converter unit to convert a DC voltage from the solar cell module, an inverter to convert the DC voltage from the converter unit into an AC voltage, and a plug to outwardly output the AC voltage from the inverter, the plug having a ground terminal electrically connected to a ground of the inverter, which is electrically connected to a ground of the solar cell module. With this configuration, the AC voltage from the solar cell module may be directly supplied to an outlet inside or outside of a building.

Meanwhile, in order to electrically connect the ground of the solar cell module and a ground of a junction box including the inverter to each other, a conductive member is provided between a frame of the solar cell module and a frame of the junction box so as to interconnect the same. Thereby, a person who installs the photovoltaic module does not need to provide a ground for the solar cell module, which ensures ease of installation.

Meanwhile, the photovoltaic module includes a first interface unit to receive an AC voltage from an adjacent photovoltaic module, and a second interface unit to output the AC voltage from the first interface unit and the AC voltage from the inverter to the plug, whereby AC voltages from a plurality of photovoltaic may be directly supplied to the outlet inside or outside the building via the single plug.

Meanwhile, a plurality of interleaving converters performs an interleaving operation, which may reduce a ripple of input current and output current of the converter unit. Accordingly, the capacity and size of switching elements inside the converter unit or the inverter may be advantageously reduced.

In the photovoltaic module, a junction box including the converter unit and the inverter may be attached to the back surface of the solar cell module. As such, the photovoltaic module may directly output the AC voltage in a stabilized manner.

A photovoltaic system according to an embodiment of the present invention includes a plurality of photovoltaic modules each including a plug provided with a ground terminal, a connector connected to each plug of the photovoltaic modules, and an integration plug connected to the connector and including a ground terminal, and each of the photovoltaic modules includes a solar cell module, a converter unit to convert a DC voltage from the solar cell module, an inverter to convert the DC voltage from the converter unit into an AC voltage, and the plug to outwardly output the AC voltage from the inverter, the plug being provided with the ground terminal. The ground terminal in each plug of the photovoltaic modules is electrically connected to a ground of the inverter, and the ground of the inverter is electrically connected to a ground of the solar cell module. In this way, AC voltages from the photovoltaic modules may be directly supplied to an outlet inside or outside a building using the connector and the integration plug.

A photovoltaic system according to an embodiment of the present invention includes a plurality of photovoltaic modules each including a plug provided with a ground terminal, a first connector connected to a first plug of a first photovoltaic module among the photovoltaic modules, a first connector plug connected to the first connector and having a ground terminal, a second connector connected to the first connector plug and connected to a second plug of a second photovoltaic module among the photovoltaic modules, and a second connector plug connected to the second connector and having a ground terminal, and each of the photovoltaic modules includes a solar cell module, a converter unit to convert a DC voltage from the solar cell module, an inverter to convert the DC voltage from the converter unit into an AC voltage, and the plug to outwardly output the AC voltage from the inverter, the plug being provided with the ground terminal. The ground terminal in each plug of the photovoltaic modules is electrically connected to a ground of the inverter, and the ground of the inverter is electrically connected to a ground of the solar cell module. In this way, AC voltages from the photovoltaic modules may be directly supplied to an outlet inside or outside a building using the first connector, the first connector plug, the second connector, and the second connector plug.

Although the embodiments of the present invention have been disclosed for illustrative purposes, those skilled in the art will appreciate that the present invention is not limited to the above-described embodiments and various modifications are possible without departing from the scope and spirit of the invention as disclosed in the accompanying claims. These modifications should not be understood separately from the idea or outlook of the present invention.

What is claimed is:

1. A photovoltaic module comprising:
a solar cell module;
a converter to convert a direct current (DC) voltage from the solar cell module;
an inverter to convert the DC voltage from the converter into an alternating current (AC) voltage;
a plug to outwardly output the AC voltage from the inverter, the plug having a ground terminal;
a first interface unit to receive an AC voltage from an adjacent photovoltaic module;
a second interface unit to output the AC voltage from the first interface unit and the AC voltage from the inverter to the plug; and
a cable provided in order to electrically connect the first interface unit and the second interface unit to each other,
wherein a first connector for coupling with the first interface unit is connected to one end of the cable, and the other end of the cable is electrically connected to the second interface unit,
wherein the ground terminal of the plug is electrically connected to a ground terminal of the inverter,
wherein the ground terminal of the inverter is electrically connected to a ground line of the solar cell module,
wherein the plug is connected to an outlet including a ground terminal or a connector including a ground terminal, and
wherein the ground terminal of the plug is connected to the ground terminal of the outlet or the ground terminal of the connector.

2. The photovoltaic module according to claim 1, further comprising a conductive member connected between a frame of the solar cell module and a frame of a junction box that includes the inverter, in order to electrically interconnect the ground line of the solar cell module and a ground of the junction box.

3. The photovoltaic module according to claim 2, wherein the frame of the junction box and the ground terminal of the inverter are electrically interconnected.

4. The photovoltaic module according to claim 2, wherein the junction box further includes at least one bypass diode to receive the DC voltage, from the solar cell module, and the converter.

5. The photovoltaic module according to claim 1, further comprising a controller to control the converter,
wherein the converter includes a plurality of interleaving converters.

6. The photovoltaic module according to claim 5, wherein the control) varies a switching period for switching elements of the interleaving converters.

7. The photovoltaic module according to claim 5, wherein the converter performs power conversion of the DC voltage so as to output a pseudo DC voltage, and
wherein the controller varies a switching period for switching elements of the interleaving converters based on a duty for driving the switching elements of the interleaving converters.

8. The photovoltaic module according to claim 5, wherein the interleaving converters include tapped inductor converters.

9. The photovoltaic module according to claim 5, wherein the interleaving converters include flyback converters.

10. A photovoltaic system comprising:
a plurality of photovoltaic modules each including a plug provided with a ground terminal;
a connector connected to each plug of the photovoltaic modules; and
an integration plug connected to the connector and provided with a ground terminal,
wherein each of the photovoltaic modules includes:
a solar cell module;
a converter to convert a DC voltage from the solar cell module;
an inverter to convert the DC voltage from the converter into an AC voltage;
the plug to outwardly output the AC voltage from the inverter, the plug being provided with the ground terminal;
a first interface unit to receive an AC voltage from an adjacent photovoltaic module;
a second interface unit to output the AC voltage from the first interface unit and the AC voltage from the inverter to the plug; and
a cable provided in order to electrically connect the first interface unit and the second interface unit to each other,
wherein a first connector for coupling with the first interface unit is connected to one end of the cable, and the other end of the cable is electrically connected to the second interface unit,
wherein the ground terminal in each plug of the photovoltaic modules is electrically connected to a ground terminal of the inverter,
wherein the ground terminal of the inverter is electrically connected to a ground line of the solar cell module,
wherein each plug of the photovoltaic modules is connected to an outlet including a ground terminal or a connector including a ground terminal, and
wherein the ground terminal of the plug is connected to the ground terminal of the outlet or the ground terminal of the connector.

11. The photovoltaic system according to claim 10, further comprising a conductive member connected between a frame of the solar cell module and a frame of a junction box that includes the inverter, in order to electrically interconnect the ground line of the solar cell module and a ground of the junction box.

12. The photovoltaic system according to claim 11, wherein the frame of the junction box and the ground terminal of the inverter are electrically interconnected.

* * * * *